US012600493B2

(12) United States Patent
Barsamian

(10) Patent No.: US 12,600,493 B2
(45) Date of Patent: Apr. 14, 2026

(54) AUTOMATED BAGGAGE HANDLING CARTS AND SYSTEMS

(71) Applicant: Accenture Global Solutions Limited, Dublin (IE)

(72) Inventor: Paul Michael Barsamian, Glenview, IL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 809 days.

(21) Appl. No.: 17/970,255

(22) Filed: Oct. 20, 2022

(65) Prior Publication Data

US 2023/0130179 A1     Apr. 27, 2023

Related U.S. Application Data

(60) Provisional application No. 63/270,753, filed on Oct. 22, 2021.

(51) Int. Cl.
*G06T 7/62* (2017.01)
*B64F 1/32* (2006.01)
(Continued)

(52) U.S. Cl.
CPC .......... *B64F 1/324* (2020.01); *G05D 1/0291* (2013.01); *G06Q 10/0833* (2013.01); *G06T 7/62* (2017.01);
(Continued)

(58) Field of Classification Search
CPC ..... B64F 1/324; B64F 1/368; G06Q 10/0833; G06Q 10/08; G06Q 10/08355;
(Continued)

(56) References Cited

U.S. PATENT DOCUMENTS 6,321,900 B1    11/2001   Micklethwaite
6,895,301 B2 *   5/2005   Mountz ................ G05D 1/0297
                                                       700/215
(Continued)

FOREIGN PATENT DOCUMENTS

CN        112278770 A     1/2021
FR          2283073 A1    3/1976
(Continued)

OTHER PUBLICATIONS

Extended Search Report in European Appln. No. 22203004.1, dated Feb. 27, 2023, 10 pages.
(Continued)

*Primary Examiner* — Patrick H Mackey
(74) *Attorney, Agent, or Firm* — Mannava & Kang, P.C.

(57)     ABSTRACT

Implementations are directed to a computer-implemented method that includes broadcasting, by one or more computing devices, a request that indicates a need for a number of carts at a location; receiving confirmation from one or more carts that accept the request, the one or more carts are carts that are close to the location; sending instructions to the one or more carts instructing the one or more carts to navigate to the location; receiving, from a scanner of a baggage handling system, scanned data of baggage that is loaded into the one or more carts assigned to transport the baggage; receiving, from each of the one or more carts, a message indicating the cart is full; and sending instructions to each cart to navigate to a destination of the baggage according to a list of bags inside each cart.

14 Claims, 21 Drawing Sheets

(51) Int. Cl.
| | |
|---|---|
| *G05D 1/00* | (2006.01) |
| *G06Q 10/0833* | (2023.01) |
| *G06V 10/74* | (2022.01) |

(52) U.S. Cl.
CPC ........ *G06V 10/761* (2022.01); *G06T 2200/04*
(2013.01)

(58) Field of Classification Search
CPC .. G06Q 10/06313; G06T 7/62; G06V 10/761;
G06V 20/10; G06V 20/52
See application file for complete search history.

(56) References Cited

U.S. PATENT DOCUMENTS

| | | | |
|---|---|---|---|
| 8,220,710 B2 * | 7/2012 | Hoffman .............. | G06Q 10/087 |
| | | | 700/214 |
| 9,457,917 B2 * | 10/2016 | Dadyala .................. | B64F 1/368 |
| 10,279,911 B2 | 5/2019 | Murphy et al. | |
| 11,378,968 B2 | 7/2022 | Velten et al. | |
| 11,560,079 B2 | 1/2023 | Lundeen et al. | |
| 11,577,858 B2 * | 2/2023 | Cottle .................... | B65G 43/08 |
| 12,007,772 B2 | 6/2024 | Senske | |
| 12,112,578 B2 * | 10/2024 | Mateer .................. | G07B 11/00 |
| 12,204,980 B2 * | 1/2025 | Bonafe ............. | G06K 7/10099 |
| 12,227,305 B2 * | 2/2025 | Keene .................. | B60P 7/0892 |
| 2007/0225993 A1 * | 9/2007 | Moore .................. | G06Q 50/40 |
| | | | 705/325 |
| 2012/0143427 A1 | 6/2012 | Hoffman et al. | |
| 2013/0048466 A1 | 2/2013 | Tsunoi | |
| 2016/0075449 A1 * | 3/2016 | Ziegler ................. | B65G 43/08 |
| | | | 700/227 |
| 2017/0004384 A1 * | 1/2017 | Audo ................. | G06Q 10/0833 |
| 2018/0018627 A1 * | 1/2018 | Ross ..................... | G06F 16/583 |
| 2018/0079601 A1 | 3/2018 | Khong et al. | |
| 2020/0233901 A1 * | 7/2020 | Crowley ............. | G06V 20/647 |
| 2021/0072754 A1 * | 3/2021 | Senske .................. | G05D 1/646 |
| 2021/0284358 A1 | 9/2021 | Cottle et al. | |

FOREIGN PATENT DOCUMENTS

| | | |
|---|---|---|
| JP | S61193917 U | 12/1986 |
| WO | WO 2021/046545 | 3/2021 |

OTHER PUBLICATIONS

Extended Search Report in European Appln. No. 22203001.7, dated
Jul. 21, 2023, 8 pages.
Article 94 Examination Report in European Application No. 22203001.
7, dated Nov. 21, 2025, 6 pages.

\* cited by examiner

140

140

140

140

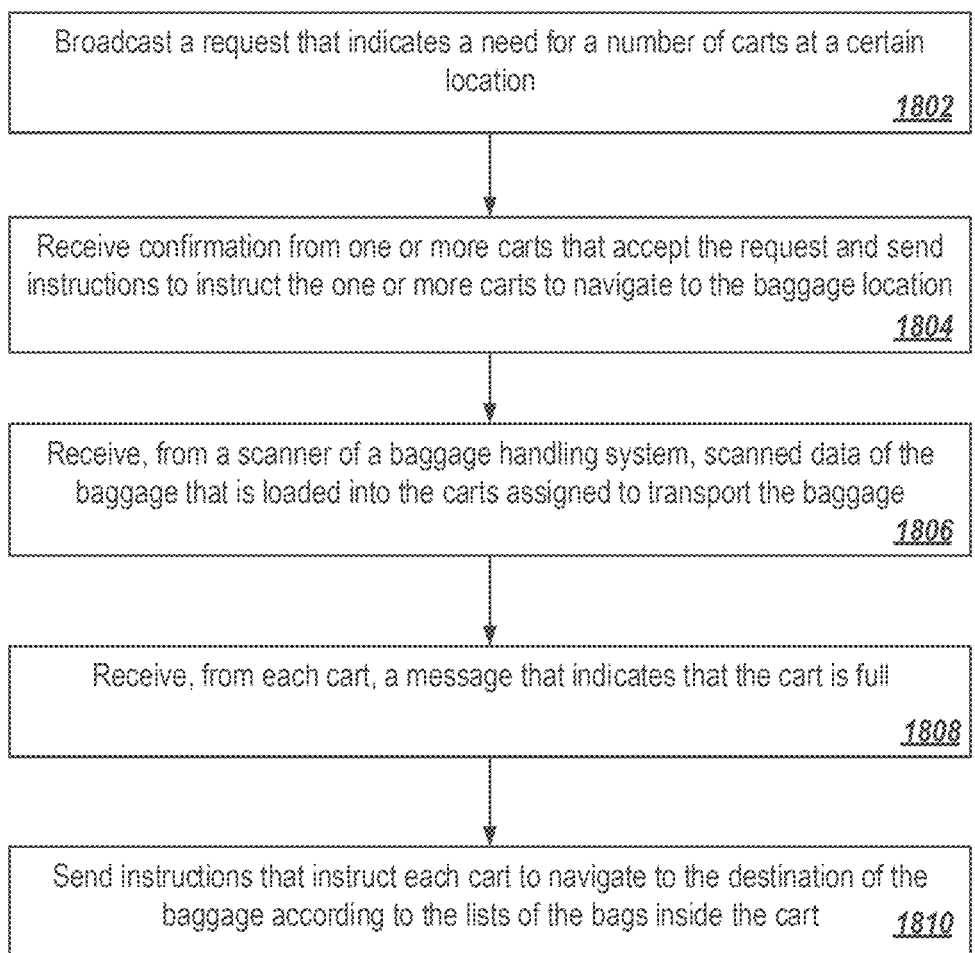

1800

| Broadcast a request that indicates a need for a number of carts at a certain location _1802_ |

| Receive confirmation from one or more carts that accept the request and send instructions to instruct the one or more carts to navigate to the baggage location _1804_ |

| Receive, from a scanner of a baggage handling system, scanned data of the baggage that is loaded into the carts assigned to transport the baggage _1806_ |

| Receive, from each cart, a message that indicates that the cart is full _1808_ |

| Send instructions that instruct each cart to navigate to the destination of the baggage according to the lists of the bags inside the cart _1810_ |

*FIG. 18*

1900A
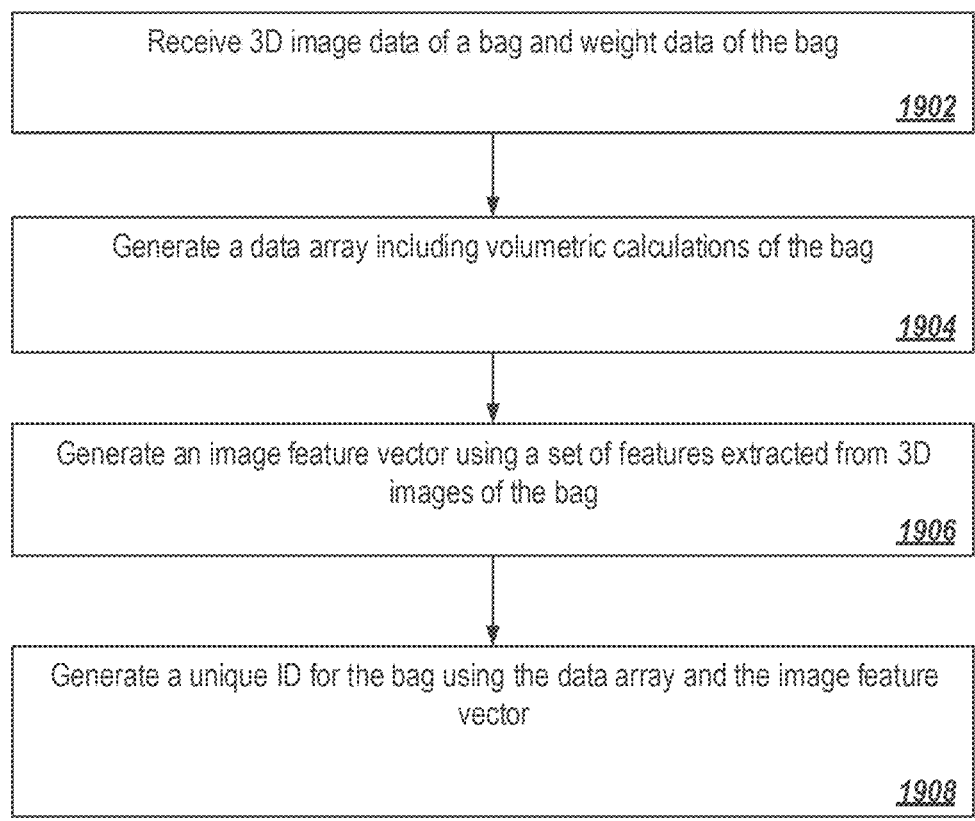
Receive 3D image data of a bag and weight data of the bag
1902
Generate a data array including volumetric calculations of the bag
1904
Generate an image feature vector using a set of features extracted from 3D images of the bag
1906
Generate a unique ID for the bag using the data array and the image feature vector
1908
*FIG. 19A*

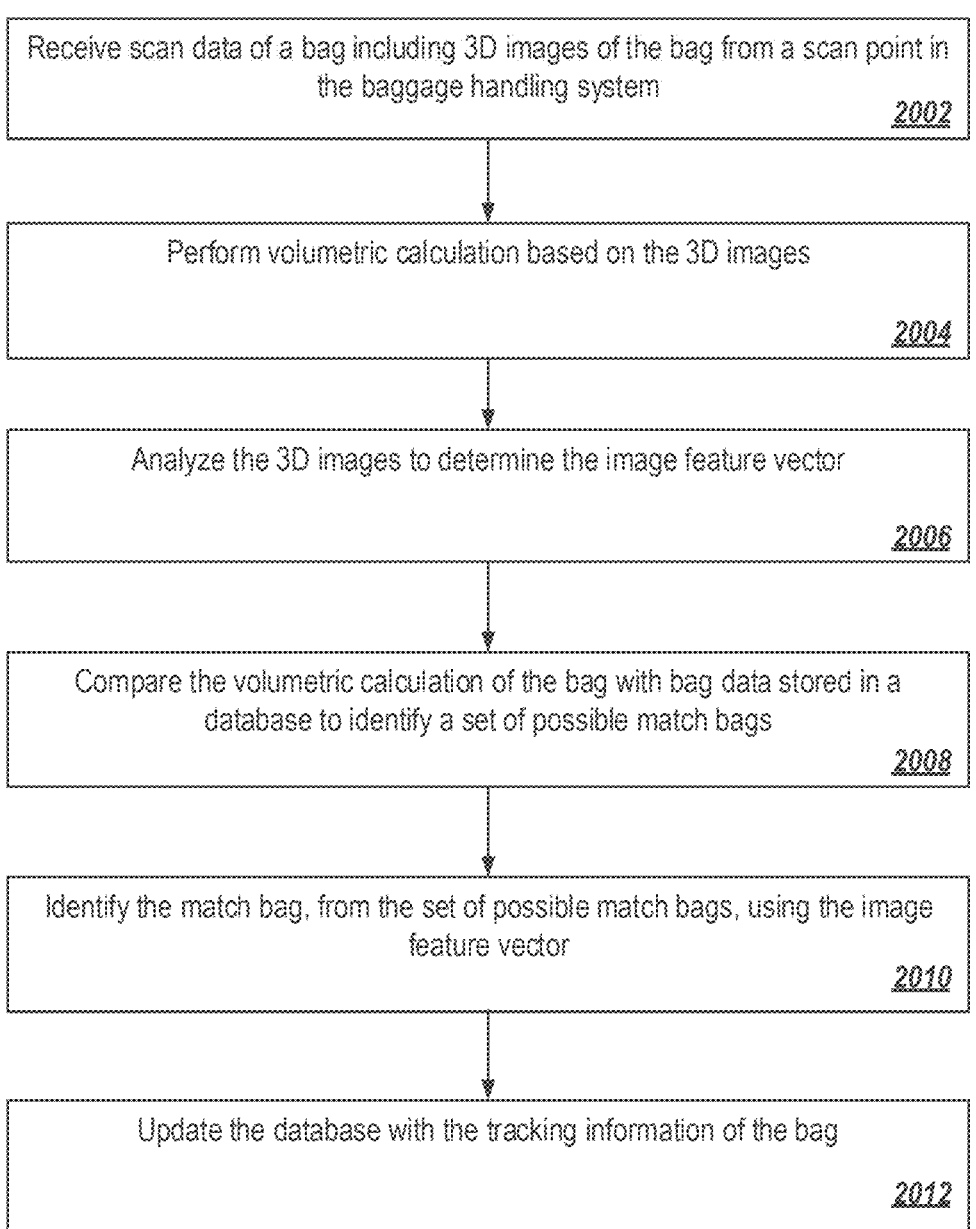

2000A

Receive scan data of a bag including 3D images of the bag from a scan point in the baggage handling system

2002

Perform volumetric calculation based on the 3D images

2004

Analyze the 3D images to determine the image feature vector

2006

Compare the volumetric calculation of the bag with bag data stored in a database to identify a set of possible match bags

2008

Identify the match bag, from the set of possible match bags, using the image feature vector

2010

Update the database with the tracking information of the bag

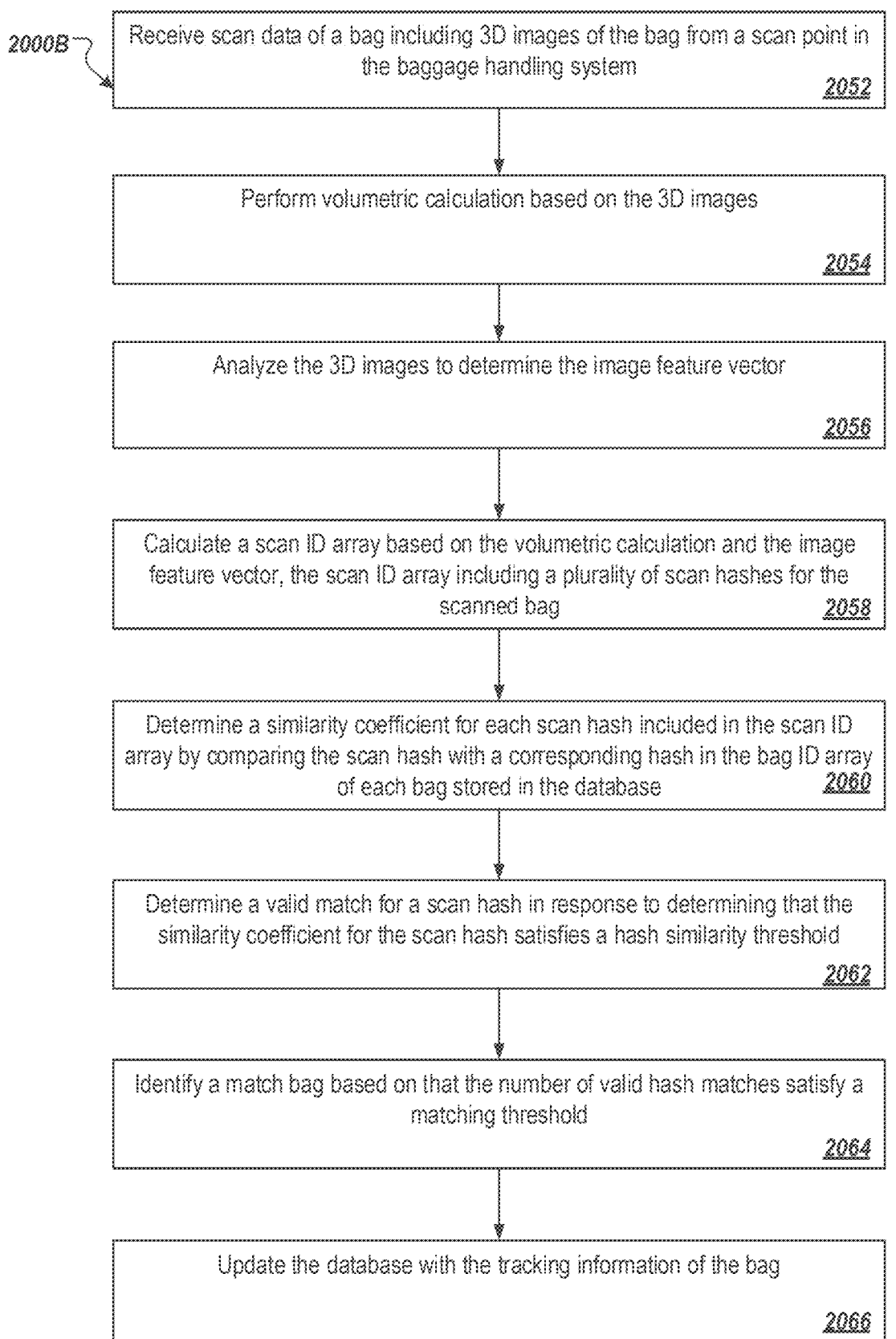

2000B

Receive scan data of a bag including 3D images of the bag from a scan point in the baggage handling system
2052

Perform volumetric calculation based on the 3D images
2054

Analyze the 3D images to determine the image feature vector
2056

Calculate a scan ID array based on the volumetric calculation and the image feature vector, the scan ID array including a plurality of scan hashes for the scanned bag                2058

Determine a similarity coefficient for each scan hash included in the scan ID array by comparing the scan hash with a corresponding hash in the bag ID array of each bag stored in the database                2060

Determine a valid match for a scan hash in response to determining that the similarity coefficient for the scan hash satisfies a hash similarity threshold
2062

Identify a match bag based on that the number of valid hash matches satisfy a matching threshold
2064

Update the database with the tracking information of the bag
2066

*FIG. 20B*

AUTOMATED BAGGAGE HANDLING CARTS AND SYSTEMS

CROSS-REFERENCE TO RELATED APPLICATIONS

This application claims the benefit of U.S. Provisional Application No. 63/270,753 filed on Oct. 22, 2021, the contents of which are incorporated by reference herein.

TECHNICAL FIELD

This specification generally relates to automated and/or autonomous baggage carts, baggage handling systems, and baggage handling management and control systems for baggage and package transportation within airports, campuses, and/or other locations.

BACKGROUND

A baggage handling system (BHS) is a system that includes multiple baggage handling carts and conveyor systems installed in airports. For example, the BHS is used to transport checked luggage from ticket counters to areas where the bags can be loaded onto airplanes. A BHS also transports checked baggage coming from airplanes to baggage claims, or to an area where the baggage can be loaded onto another airplane. A BHS is made up of a number of different processes and checks. In some cases, a BHS is designed to count bags, check weights of bags, balance loads, screen suitcases for security reasons, transport bags through an airport conveyor belt system and read bag information automatically.

Conventional BHSs have many aspects that require manual labor. Additionally, conventional BHSs are prone to routing errors, delays, and tend to be resource intensive.

SUMMARY

This document describes automated and/or autonomous material handling equipment including conveyors, baggage carts, BHSs for baggage and package management, and baggage handling management and control logistics systems (also referred to as control systems), within airports, campuses, order fulfillment centers, warehouses, and/or other locations. In some implementations, the control systems described herein can instruct one or more carts in the baggage handling system to automatically move baggage located in a certain location to a destination. The control system can receive locations of the carts as the carts begin navigation to the destination. So that the control system can monitor and track the locations of the carts and the list of bags inside the carts. The control system can also generate tagless ID for the bags. The control system can receive scanned data of the baggage from cameras at different scan points in the baggage handling system. The control system can monitor and track the baggage that is transported. For example, the control system can recognize and track the tagless bags during the transportation of the bags based on scanned data of the bags at different scan points in the baggage handling system.

The automated and/or autonomous material management and control system (e.g., conveyors, baggage carts, BHSs, and control system) described herein may be used to provide one or more of the following optional benefits and advantages. First, the conveyors, baggage carts and BHSs described herein can receive instructions from the control system and perform instructed operations automatically. The conveyors, baggage carts and BHSs are more automated in comparison to conventional systems. Accordingly, the conveyors, baggage carts and BHSs described herein enhance worker safety by reducing the need for manual handling of baggage. The enhanced safety can provide benefits such as increased worker satisfaction, enhanced baggage handling system runtime availability or overall equipment effectiveness, and reduced operational costs.

Second, in some implementations, the automation provided by the BHSs and the control systems described herein can provide lower overall operational costs due to reducing the needs for human labor.

Third, in some implementations, the traceability of baggage items is enhanced using the BHSs and the control system described herein, and routing errors are reduced. These enhancements can lead to increased customer satisfaction.

In one aspect, this document describes a method for automated baggage handling management and control. The method includes broadcasting, by one or more computing devices, a request that indicates a need for a number of carts at a location; receiving confirmation from one or more carts that accept the request, the one or more carts are carts that are close to the location; sending instructions to the one or more carts instructing the one or more carts to navigate to the location; receiving, from a scanner of a baggage handling system, scanned data of baggage that is loaded into the one or more carts assigned to transport the baggage; receiving, from each of the one or more carts, a message indicating the cart is full; and sending instructions to each cart to navigate to a destination of the baggage according to a list of bags inside each cart.

Other embodiments of this aspect include corresponding computer systems, apparatus, computer program products, and computer programs recorded on one or more computer storage devices, each configured to perform the actions of the method. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can each optionally include one or more of the following features, alone or in combination. In some implementations, the method includes receiving three-dimension (3D) images of the bag; generating, using the 3D images of the bag, a data array including volumetric calculations of the bag; generating a image feature vector using a set of features extracted from the 3D images of the bag; and generating a unique identifier (ID) for the bag using the data array and the image feature vector. In some implementations, the volumetric calculations of the bag include average values of length, width, and height of the bag.

In some implementations, generating the unique ID for the bag includes hashing the data array and the image feature vector separately to obtain resulting hashes; concatenating the resulting hashes to obtain a concatenated result; and hashing the concatenated result to create the unique ID for the bag.

In some implementations, the method includes receiving, from a scan point of the baggage handling system, scan data of a bag comprising 3D images of the bag; performing volumetric calculation based on the 3D images; analyzing the 3D images to determine the image feature vector; comparing the volumetric calculation of the bag with bag data stored in a database to identify a set of possible match bags; identifying a match bag, from the set of possible match bags, using the image feature vector; and updating the database with tracking information of the bag, wherein the tracking information comprises the ID of the match bag, a timestamp, and a location of the scan point.

In some implementations, generating the unique ID for the bag includes: pairing the image feature vector with each value individually in the data array to obtain a pairing array; hashing each value in the pairing array to obtain a corresponding hash result; and generating, as the ID of the bag, an ID array including each hash result.

In some implementations, the method includes receiving, from a scan point of the baggage handling system, scan data of a bag comprising 3D images of the bag; performing volumetric calculation based on the 3D images; analyzing the 3D images to determine the image feature vector; calculating a scan ID array based on the volumetric calculation and the image feature vector, wherein the scan ID array includes a plurality of scan hashes for the bag; determining a similarity coefficient for each scan hash included in the scan ID array by comparing the scan hash with a corresponding hash in the ID array of each bag stored in a database; determining a valid match for a scan hash in response to determining that the similarity coefficient for the scan hash satisfies a hash similarity threshold; identifying a match bag based on that a number of valid hash matches between the scan ID array and the ID array of the match bag satisfies a matching threshold; and updating the database with tracking information of the bag, wherein the tracking information comprises the ID of the match bag, a timestamp, and a location of the scan point.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

FIG. 18 is an example flow process of moving baggage to a destination.

FIG. 19A is an example flow process for tagless bag identification (ID) generation.

FIG. 20A is an example flow process for tagless baggage recognition and tracking in one implementation.

FIG. 20B is an example flow process for tagless baggage recognition and tracking in another implementation.

Like reference numbers and designations in the various drawings indicate like elements.

DETAILED DESCRIPTION

Figure 1:
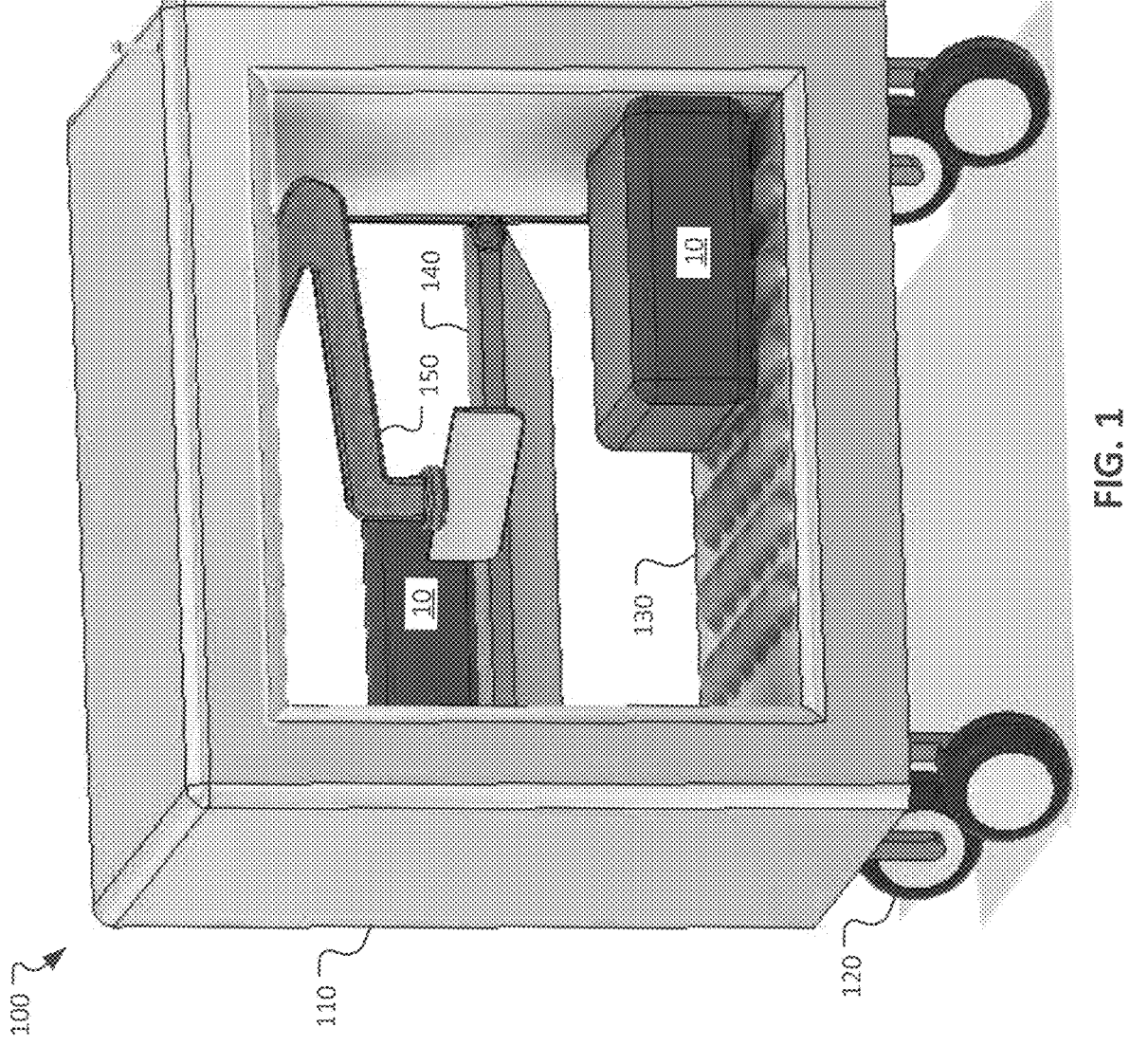
FIG. 1 is a perspective view of an example baggage cart in accordance with some embodiments.
Figure 2:
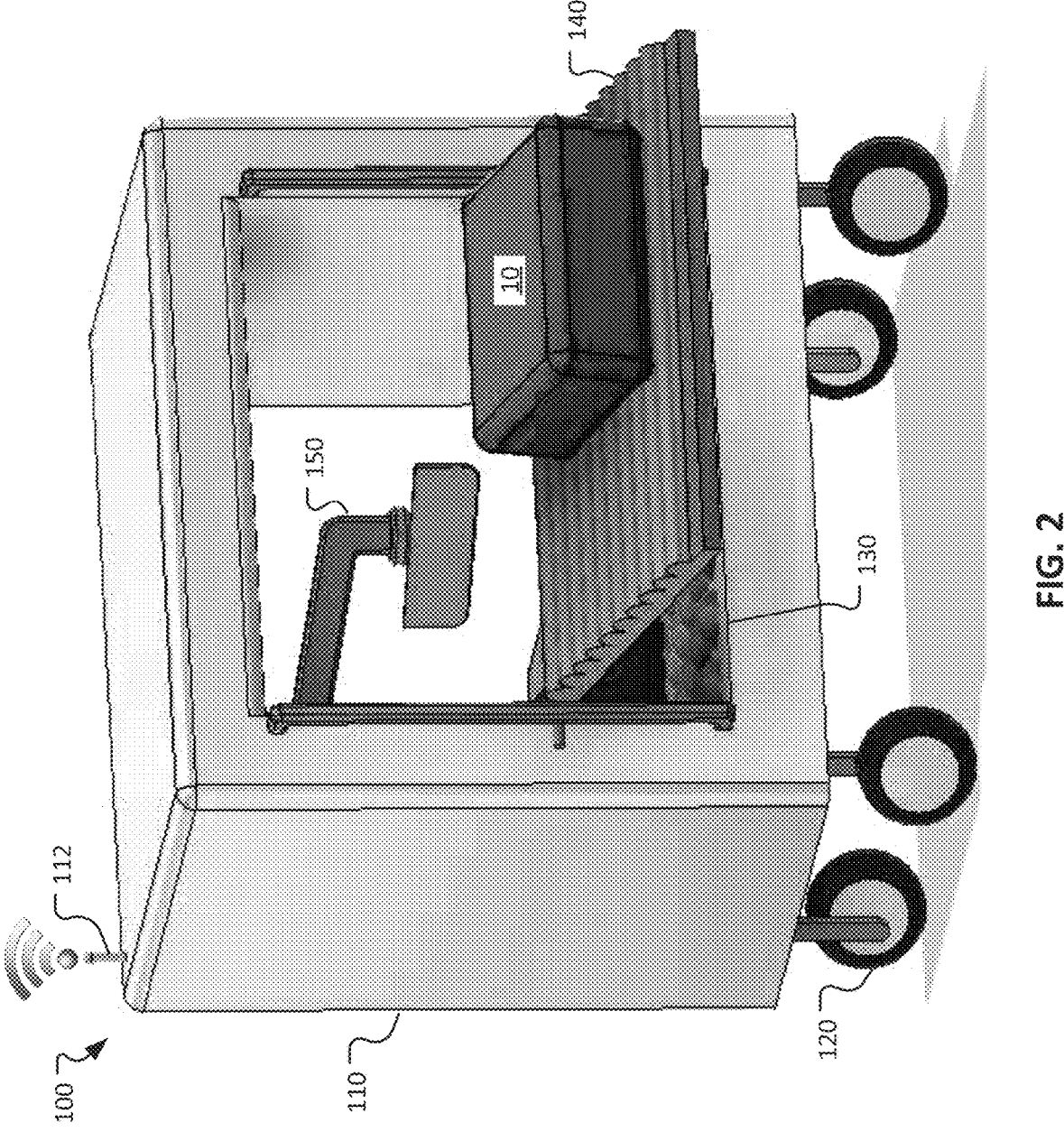
FIG. 2 is another perspective view of the baggage cart of FIG. 1.
Figure 3:
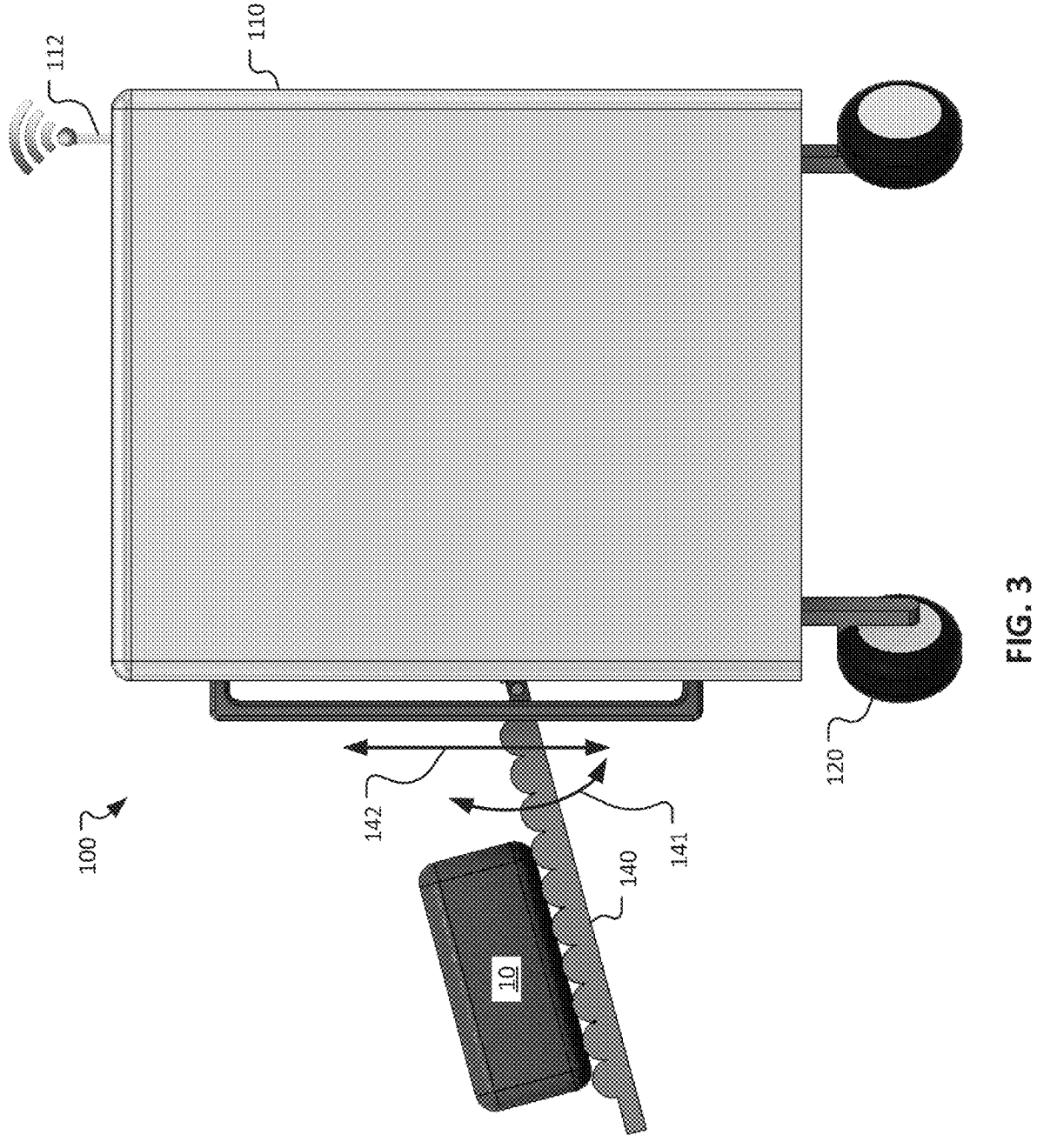
FIG. 3 is a side view of the baggage cart of FIG. 1.
Figure 4A:
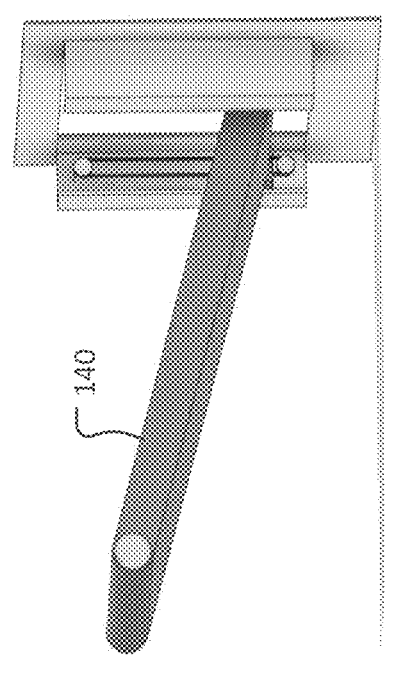
FIGS. 4A-4D are perspective views showing various orientations of a door conveyor of the baggage cart of FIG. 1.
Figure 4B:
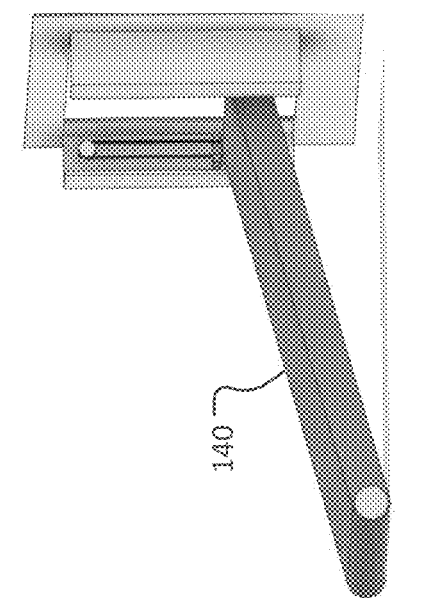
Figure 4C:
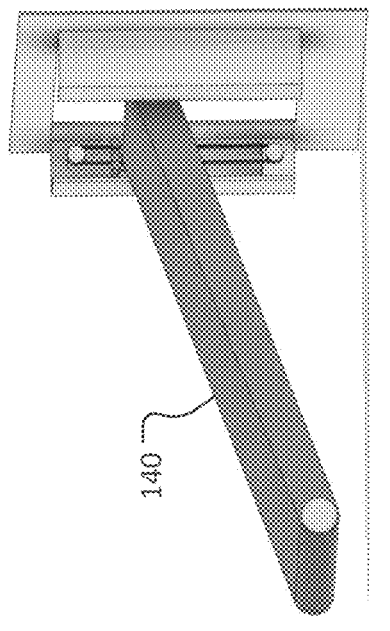
Figure 4D:
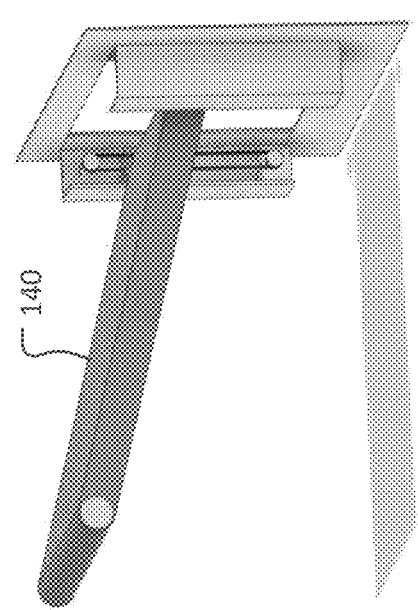
Figure 5:
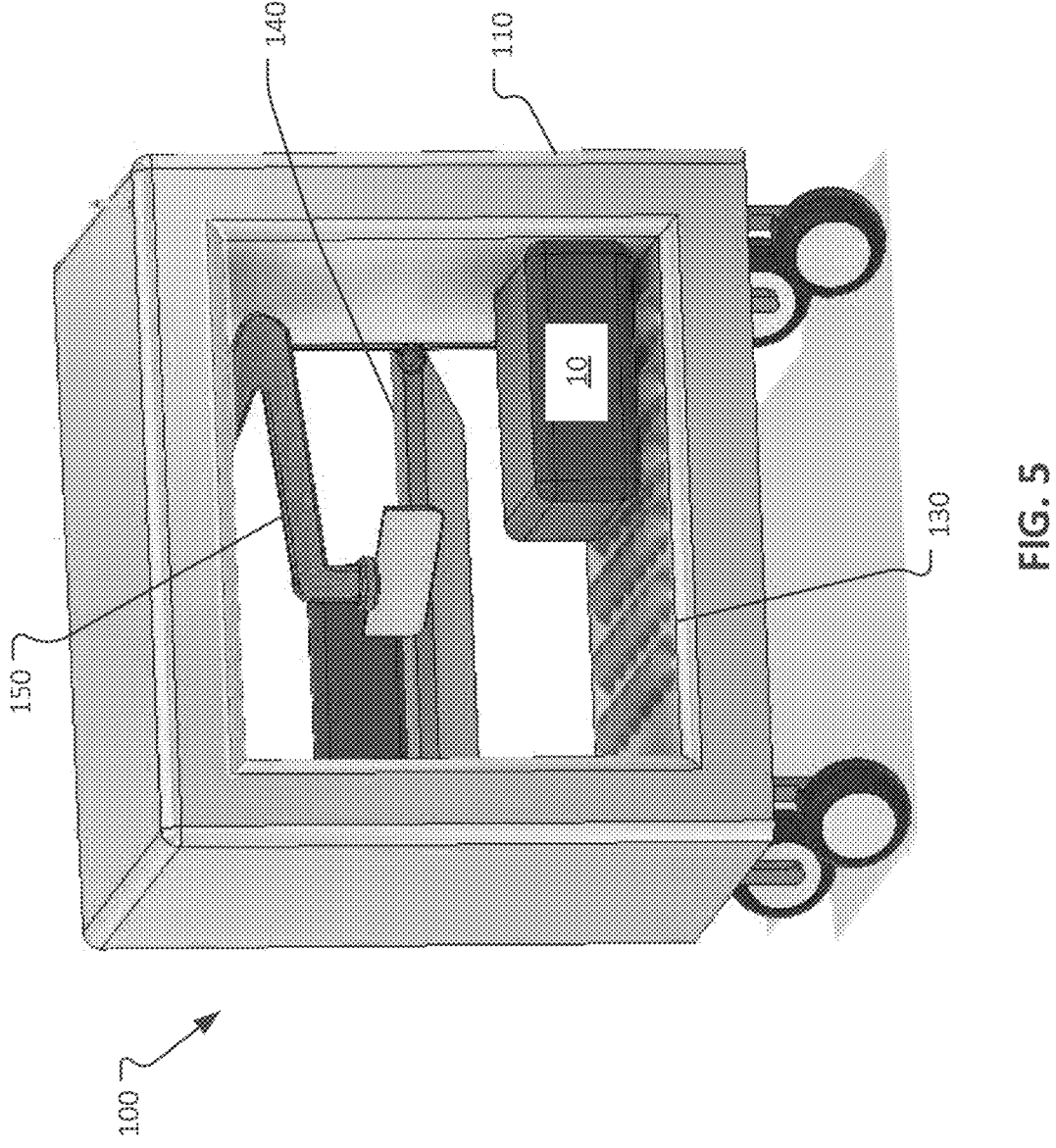
FIG. 5 is another perspective view of the baggage cart of FIG. 1.

As described further below, this document describes automated and/or autonomous baggage handling management and control systems for baggage and package movement within facilities such as airports, campuses, order fulfillment centers, warehouses, and/or other locations. The baggage or package is used as an example. The methods and systems described in this document can be used to manage and control other objects.

FIGS. 1-8 illustrate an example autonomous baggage cart 100 that can be used as part of the BHSs described herein. The baggage cart 100 can contain, identify, autonomously transport, and automatically transfer one or more baggage items 10.

While the concepts for baggage and package movement and management are being described herein primarily in the context of a baggage cart 100, it should be understood that the concepts can be implemented in other form factors in addition to the baggage cart 100. For example, in some embodiments the conveyor portion of the baggage cart 100 can be used separately from the cart portion of the baggage cart 100. That is, as described further below, the conveyor portion alone can be used to transfer parcels, containers, boxes, items, baggage, and/or packages between any two areas, such as between two conveyor systems, and the like.

The baggage cart 100 includes a cart body 110, wheels 120, a conveyor ball floor 130, a door conveyor 140, and a robotic pusher arm 150. In some embodiments, the baggage cart 100 can include one or more additional features that are not visible. For example, in some embodiments the baggage cart 100 includes an on-board battery and a drive system by which the baggage cart 100 is autonomously mobile using the wheels 120. The baggage cart 100 can also include an on-board microcomputer and wireless communication system. In some embodiments, the baggage cart 100 also includes an on-board vision system. The baggage cart 100 can also include one or more on-board sensors, scanners, and the like.

In some embodiments, the baggage cart 100 is configured to autonomously transport baggage items 10 under the control or directions from a computerized baggage handling management and control system as described further below. For example, in some embodiments the baggage cart 100 includes an antenna 112 and an on-board microcomputer running lightweight firmware/OS for wireless communication, tasking, and/or messaging and integration with a remotely located computerized baggage handling management and control logistics system. Accordingly, in some embodiments the baggage cart 100 is equipped to self-report bags on board with an effectively continuous broadcast. In some embodiments, the on-board microcomputer of the baggage cart 100 can fully or partly manage AGV routing, location, and navigation in addition to responding to tasking from external computerized baggage handling management and control logistics systems.

In some embodiments, the cart body 110 can include curb sensors, roadway sensors, navigation wire sensors, and/or other sensor arrays along the outer floor edge of the vehicle for navigation, parking, and collision avoidance assistance.

In some embodiments, the wheels 120 of the baggage cart 100 are configured to be driven by one or more on-board electric motors to convey the baggage cart 100. For example, in some embodiments the wheels 102 can be Mecanum omnidirectional drive wheels that allow the cart body 110 to rotate, move and turn with zero radius, and to navigate and park in forward, reverse, and sideways. Other types of conveyance systems that are suitable for automated guided vehicles and/or mobile robots can also be used.

The conveyor ball floor 130 of the baggage cart 100 can function to move baggage items 10 in any planar direction along the conveyor ball floor 130. This can functionality can be utilized during loading and unloading of one or more baggage items 10 to/from the baggage cart 100. In addition to loading and unloading, the functionality of the conveyor ball floor 130 can be utilized in conjunction with the on-board vision system to increase the packing density of the baggage items 10 in the baggage cart 100.

The baggage cart 100 also includes the door conveyor 140. While in the depicted embodiment a single door conveyor 140 is included, in some embodiments two door conveyors 140 are included in a single baggage cart 100. The door conveyor 140 is movable coupled to the cart body 110. For example, in the depicted embodiment the door conveyor 140 is pivotable in relation to the cart body 110 as indicated by the curved arrow 141. In addition, in the depicted embodiment the door conveyor 140 is translatable along the face of the cart body 110 as indicated by the arrow 142. These motions of the door conveyor 140 relative to the cart body 110 can be automatic (e.g., controlled by the on-board microcomputer and/or vision system.

FIGS. 4A-4D depicted various orientations of the door conveyor 140 relative to the cart body 110. Here, the door conveyor 140 is shown separately from the baggage cart 100. Accordingly, it should be understood that the concepts of the door conveyor 140 can be implemented in other form factors in addition to the baggage cart 100, as described further below. For example, in some embodiments the door conveyor 140 can be used separately from the cart portion of the baggage cart 100. That is, the door conveyor 140 portion alone can be used to transfer parcels, boxes, containers, items, baggage and/or packages between any two areas, such as between two conveyor systems, and the like. In such a case, the door conveyor 140 can be mounted on frame with wheels/casters in some embodiments.

The conveyance of the baggage items 10 on the door conveyor 140 can be powered and automatic. That is, the door conveyor 140 can be a powered conveyor. Accordingly, the baggage items 10 can be automatically loaded into or unloaded from the baggage cart 100. In some embodiments, the door conveyor 140 can automatically telescope to increase or decrease its length. In some embodiments, the door conveyor 140 can passively telescope to increase or decrease its length.

In some embodiments, the baggage cart 100 also includes the robotic pusher arm 150. However, the robotic pusher arm 150 is optional. In some embodiments, the robotic pusher arm 150 can automatically push baggage items 10 onto the door conveyor 140 during unloading. In some embodiments, the robotic pusher arm 150 can automatically push baggage items 10 around within the interior space of the cart body 110 to arrange the baggage items 10 (e.g., to increase packing density). The robotic pusher arm 150 can be a single robotic arm or paired robot arms suspended from ceiling of the cart body 110. An on-board vision system can use a high speed algorithm, along with the layer sensor of the door conveyor 140, to determine where to push a baggage item 10 in the layer of baggage items 10 within the cart body 110.

Figure 6:
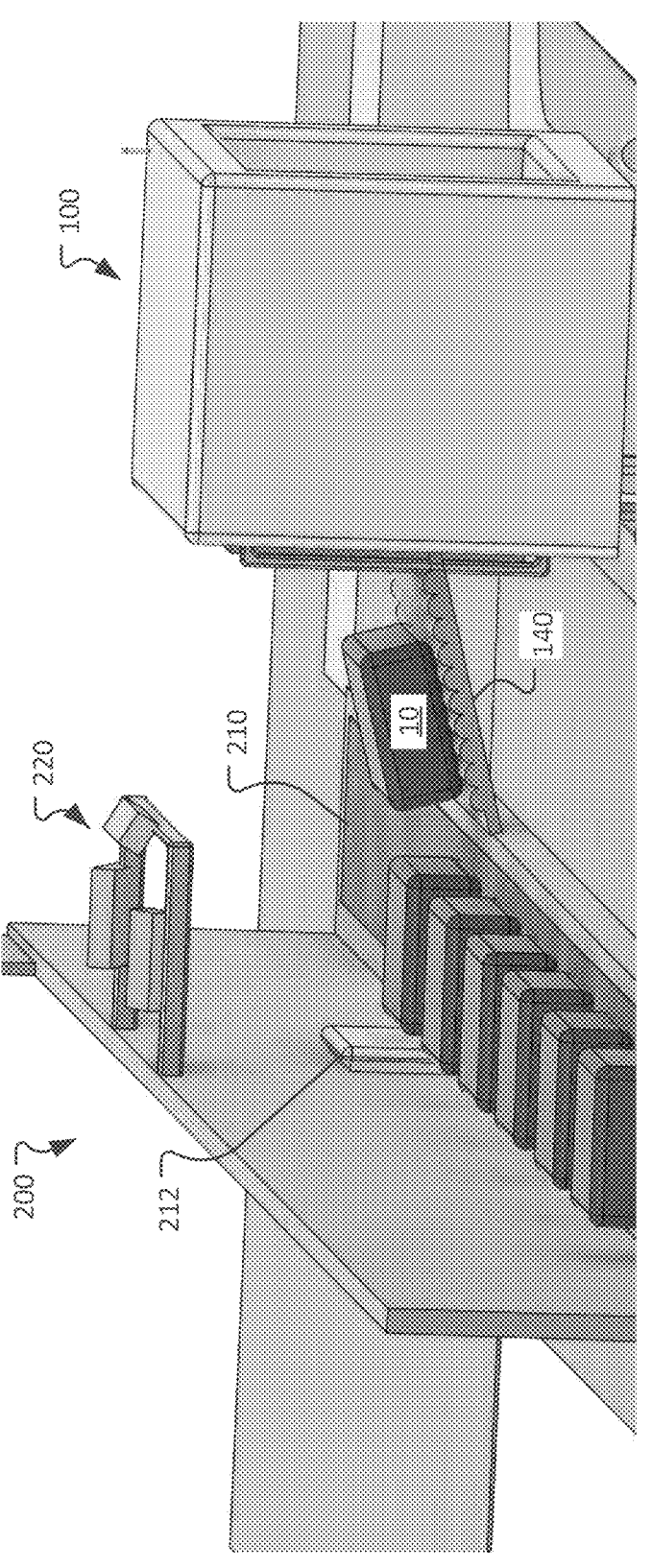
FIGS. 6 and 7 are perspective views of the baggage cart of FIG. 1 in the process of loading or unloading bags to/from a conveyor system.

FIG. 6 illustrates the functionality of the baggage cart 100 in conjunction with a baggage conveyor system 200. The baggage cart 100 can interface with a conveyor 210 to load and/or unload baggage items 10. In particular, the door conveyor 140 can be automatically orientated (e.g., the vertical position and angular orientation) in relation to the conveyor 210 so that baggage items 10 can be transferred between the conveyor 210 and the door conveyor 140. In some embodiments, the baggage conveyor system 200 can also include a baggage pusher 212 to automatically push individual baggage items 10 onto the door conveyor 140.

In some embodiments, the baggage conveyor system 200 includes a scanner system 220 that can scan bar codes (or read RFID chips) on tags attached to the baggage items 10. Accordingly, the baggage items 10 are traceable. For example, using the scanner system 220, the identities of individual baggage items 10 can be determined while loading and/or unloading the baggage items 10 to/from the baggage cart 100. In some embodiments, the baggage cart 100 can also include a scanner system that can read bar codes or RFID chips. The scanner system 430 can be in communication with the control system to facilitate traceability of the baggage items 10.

The scanner system 220 can also be used to sort the baggage items 10. That is, using the scanner system 220 some particular baggage items 10 can be loaded into a particular baggage cart 100 (e.g., those baggage items 10 that need to go to a particular airplane or other destination), while other baggage items 10 can be passed over rather than being loaded into the particular baggage cart 100.

Figure 7:
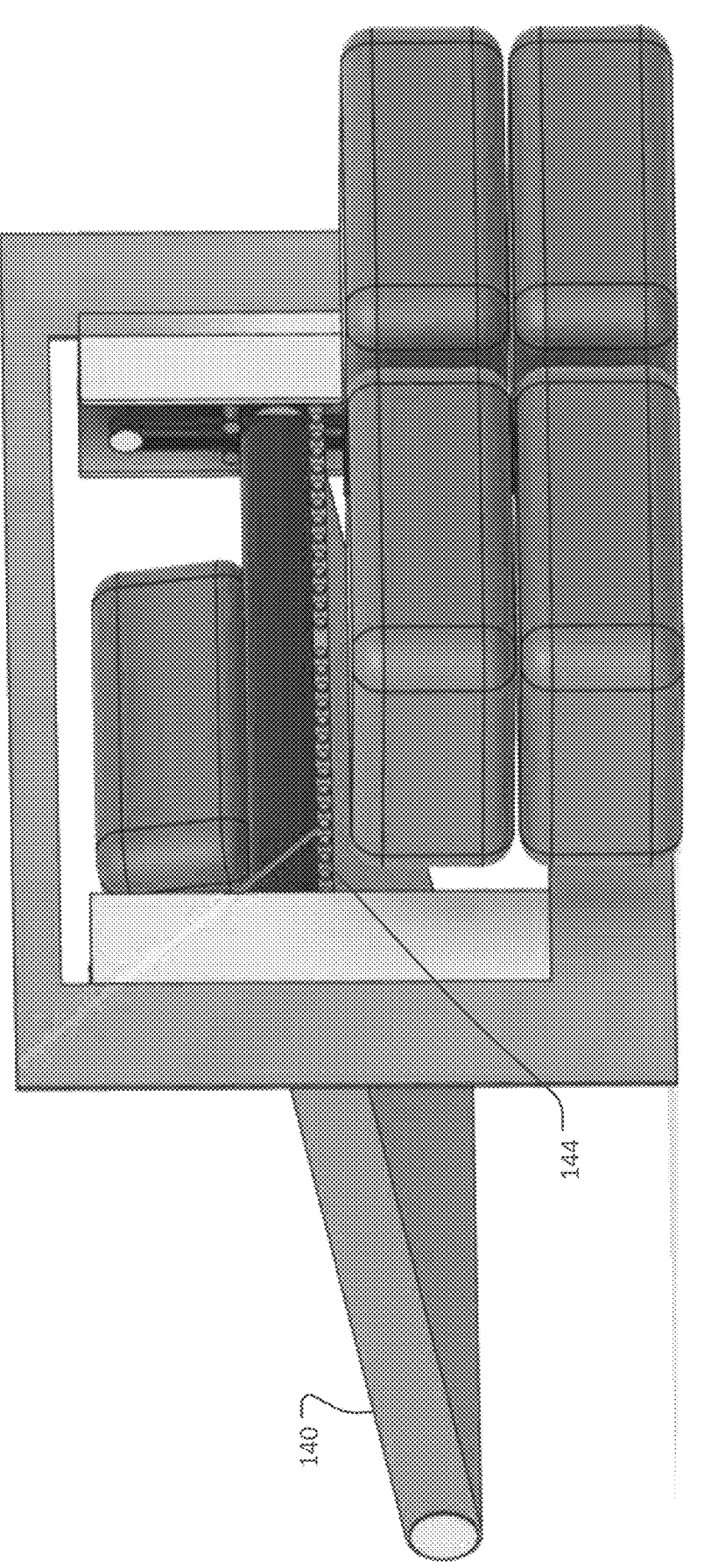

FIG. 7 illustrates that some embodiments, the door conveyor 140 includes one or more layer sensors 144 (e.g., optical sensors, ultrasonic sensors, etc.) to sense the position of the upper-most layer of the baggage items 10, and to indicate that the up/down movement of the door conveyor 140 for loading or unloading the next layer of the baggage items 10 should take place. For example, when baggage items 10 are being transferred into the baggage cart 100, in some embodiments the door conveyor 140 will automatically move upward when the layer sensors 144 determine that there is no more room for baggage items 10 in the current layer. Conversely, when baggage items 10 are being transferred out of the baggage cart 100, in some embodiments the door conveyor 140 will automatically move downward when the layer sensors 144 determine that there are no baggage items 10 in the current layer.

In some embodiments, the door conveyor 140 can automatically telescope to increase or decrease its length. In some embodiments, the door conveyor 140 can passively telescope to increase or decrease its length.

Figure 8:
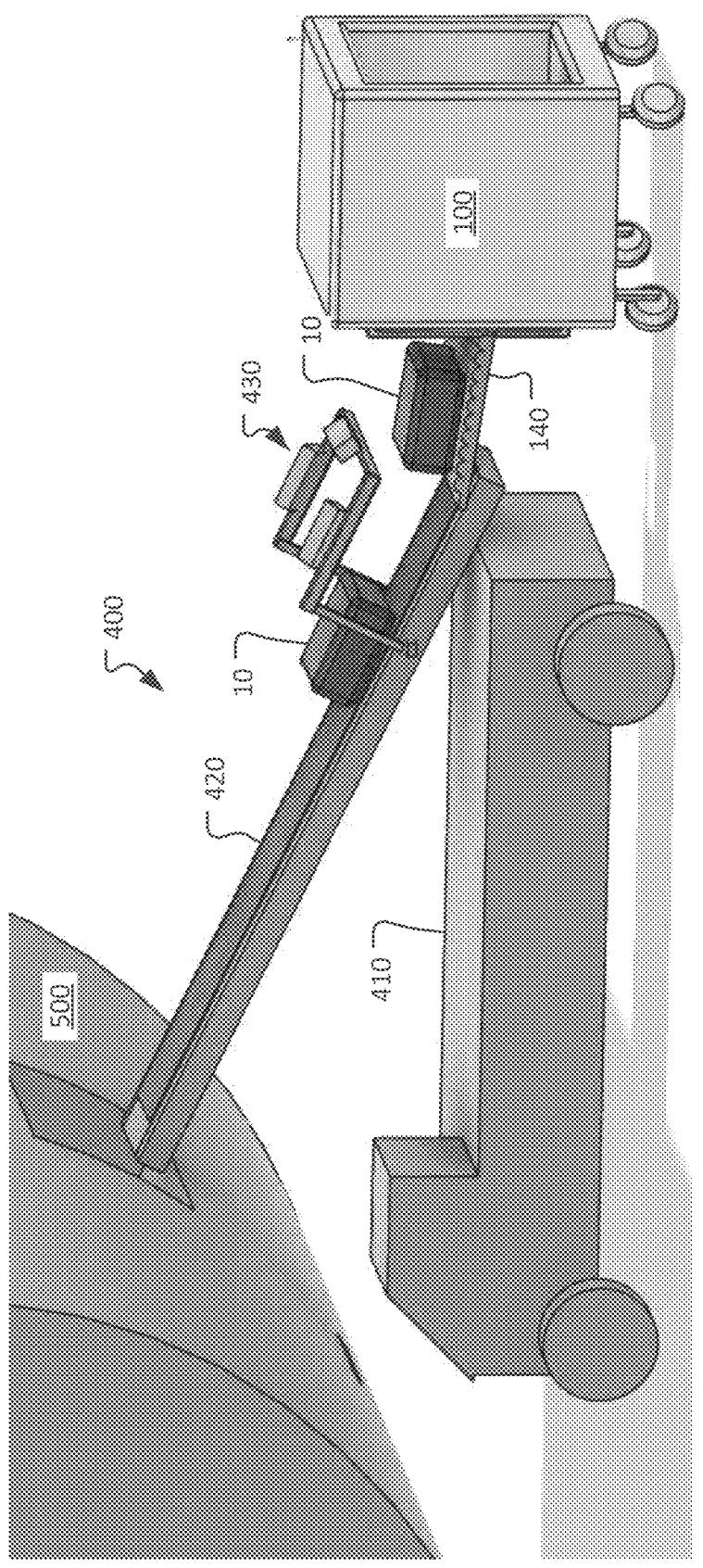
FIG. 8 is a perspective view of the baggage cart of FIG. 1 in the process of loading or unloading bags to/from a conveyor ramp truck.
Figure 9:
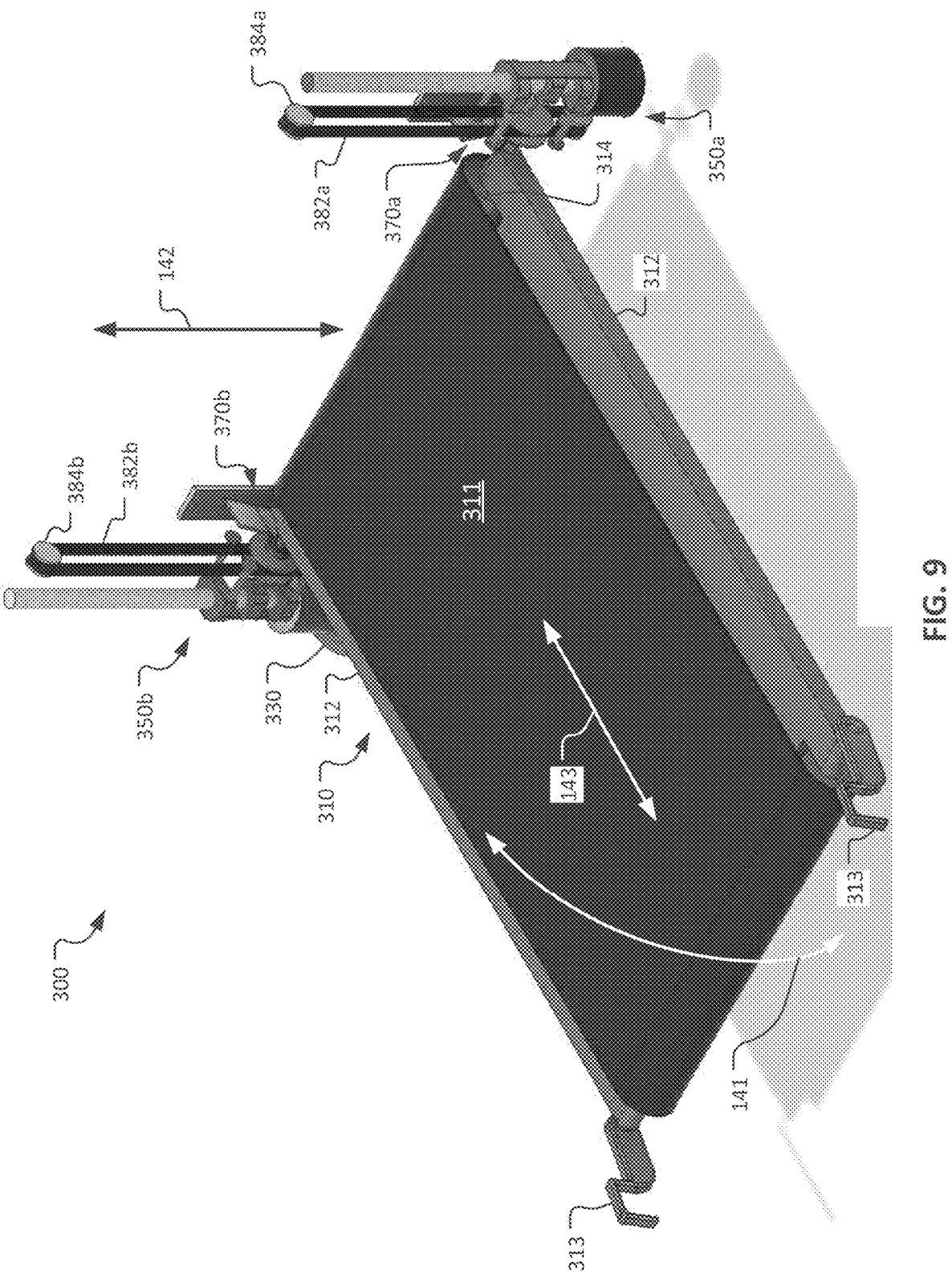
FIG. 9 is a perspective view of an example material handling system in accordance with some embodiments.
Figure 10:
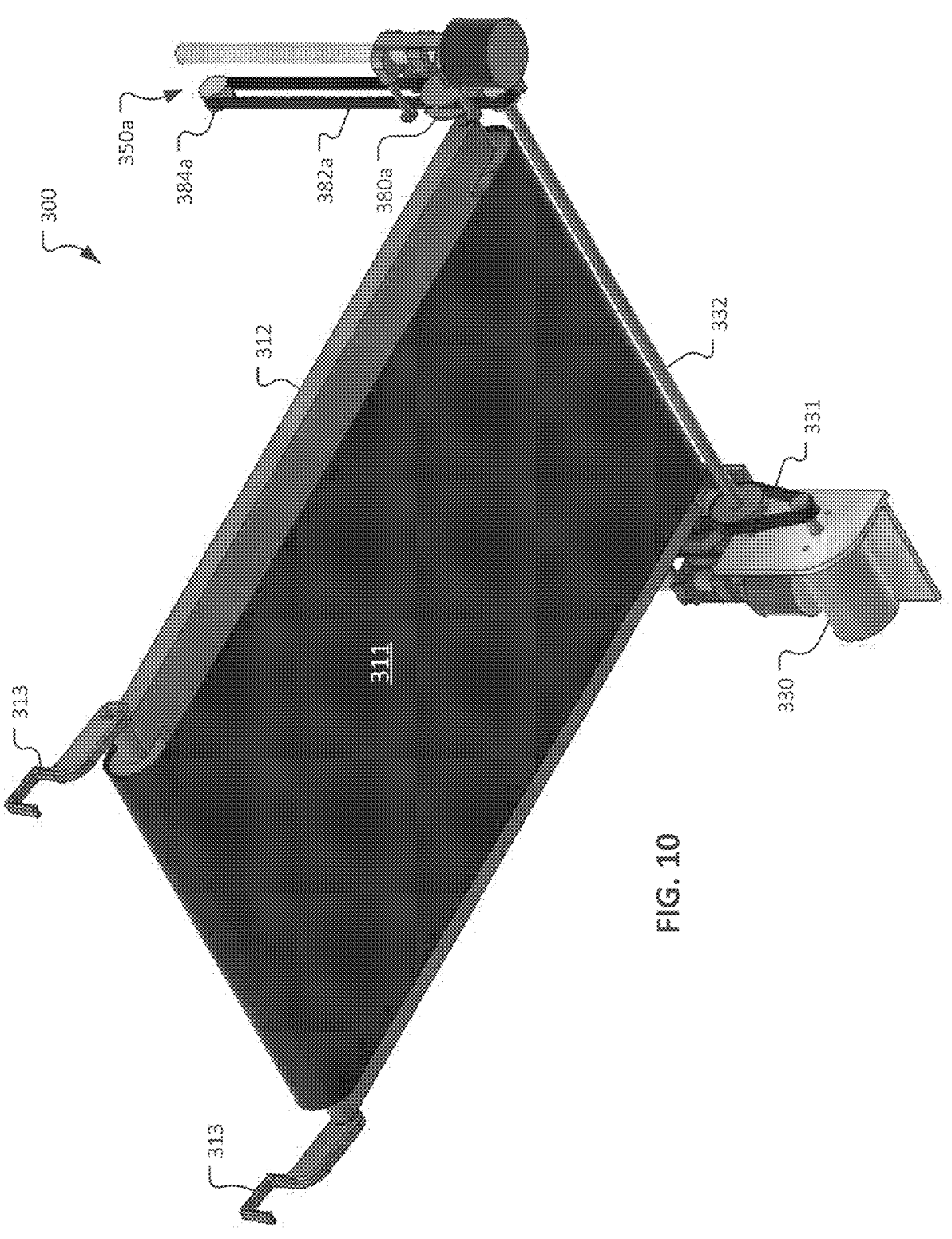
FIG. 10 is another perspective view of the material handling system of FIG. 9.

Referring to FIG. 8, the baggage carts 100 can autonomously travel onto a tarmac for loading or unloading of baggage items 10 to/from an airplane 500 using a conveyor ramp truck 400. The door conveyor 140 can automatically open and orient itself to interface with a conveyor 420 that is pivotably mounted to a truck 410. Baggage items 10 can be transferred between the baggage cart 100 and the conveyor 420 using one or more of the door conveyor 140, the robotic pusher arm 150 (not visible), on-board vision system, on-board sensors, scanner system, etc.

The conveyor ramp truck 400 can include a scanner system 430 for scanning bar codes or RFID chips of the baggage items 10 being transferred between the baggage cart 100 and the conveyor 420. The scanner system 430 can be in communication with the control system to facilitate traceability of the baggage items 10.

FIGS. 9-16 illustrate an example material handling system 300. In some embodiments, the material handling system 300 can be used to function as the door conveyor 140 described above. In the depicted embodiment, the material handling system 300 includes a conveyor belt 311 that can be driven to transport various types of items (e.g., parcels, boxes, suitcases, items, envelops, packages, goods, totes, containers, etc.). In some embodiments, the material handling system 300 can be a roller conveyor or another type of conveyor.

While the door conveyor 140 is primarily described above in the context of the baggage cart 100, the material handling system 300 has beneficial utility in many other implementations. For example, in some embodiments the material handling system 300 can be used for transferring items from, to, and/or between various types of conveyors, racks, trucks, shipping containers, carts, pallets, and the like, and any combination thereof. Moreover, in some embodiments the material handling system 300 can be used for receiving and/or loading items manually and/or robotically. For example, in some embodiments the material handling system 300 can be used to load a shipping container with multiple items that are placed onto the material handling system 300 manually and/or robotically.

In some embodiments, the material handling system 300 is mounted to a mobile frame that includes wheels, or that can be transported using a pallet jack or fork truck, and the like. In such a case, the material handling system 300 can be transported to various locations for temporary use in a particular location of multiple locations, as desired. In other cases, the material handling system 300 can be mounted in a fixed location (e.g., next to a conveyor—mounted to the floor or to the conveyor and the like).

The structure and operation of the material handling system 300 will now be described. The material handling system 300 broadly includes a conveyor 310, a first motor 330, and one or more clutches 340 (shown in the figures as two clutches 340a and 340b; collectively referred to as "clutch 340a/b"). While the depicted embodiment includes two clutches 340a/b, in some embodiments a single clutch 340a or 340b is included.

As described further below, the material handling system 300 mechanically has at least three degrees of freedom. First, the elevation of the conveyor 310 (or at least the driven end of the conveyor 310) can be changed (raised and/or lowered). This is illustrated by a double arrow 142 in FIGS. 3 and 9. Second, the angle of the conveyor 310 can be adjusted. Said another way, the conveyor 310 can be tilted or pivoted. This is illustrated by an arcuate double arrow 141 in FIGS. 3 and 9. Third, the conveyor 310 can be driven so that items placed onto the conveyor 310 are transported by the conveyor 310. This is illustrated by a double arrow 143 in FIG. 9.

Figure 11:
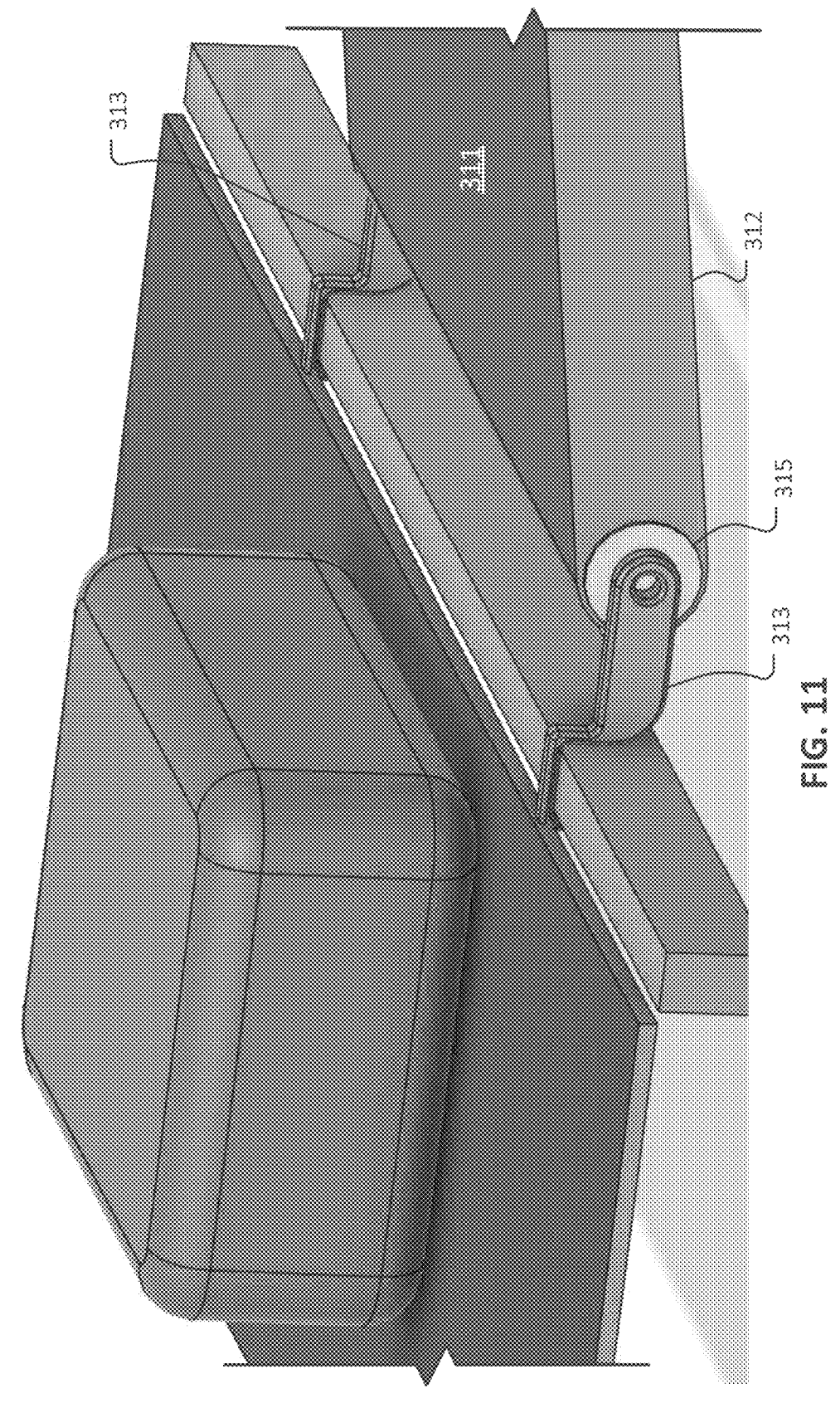
FIG. 11 is a perspective view of a second end of the material handling system of FIG. 9 in engagement with an example conveyor system.

The conveyor 310 includes a frame 312 and a first conveyor roller 314 having a first axle 316. The first conveyor roller 314 is a driven roller. The conveyor 310 can also include a second conveyor roller 315 (FIG. 11) which can be an idler roller. The belt 311 (which is like a loop) can extend between/around the first conveyor roller 314 and the second conveyor roller 315. Also shown predominantly in FIG. 11 are two conveyor attachment arms 313. The conveyor attachment arms 313 can be used for releasably coupling the conveyor 310 to another piece of equipment (such as a conveyor, cart, item receptacle, etc.).

In the depicted embodiment, the first conveyor roller 314 and the first axle 316 are affixed (rigidly coupled) to each other. Accordingly, rotations of the first axle 316 result in rotations of the first conveyor roller 314 (which drives the conveyor belt 311 to transport items that are on the belt 311).

In the depicted embodiment, in order to change the elevation of the conveyor 310, the material handling system 300 includes a first linear actuator 350a and a second linear actuator 350b (collectively referred to as "linear actuator 350a/b"). The linear actuator 350a/b can be activated to raise or lower the first axle 316, which raises or lowers at least the driven end of the conveyor 310 (as indicated by the arrow 142 in FIG. 9). In some embodiments, the linear actuator 350a/b can be controlled by, or in response to, signals from the one or more layer sensors 144 (e.g., see FIG. 7).

Figure 12:
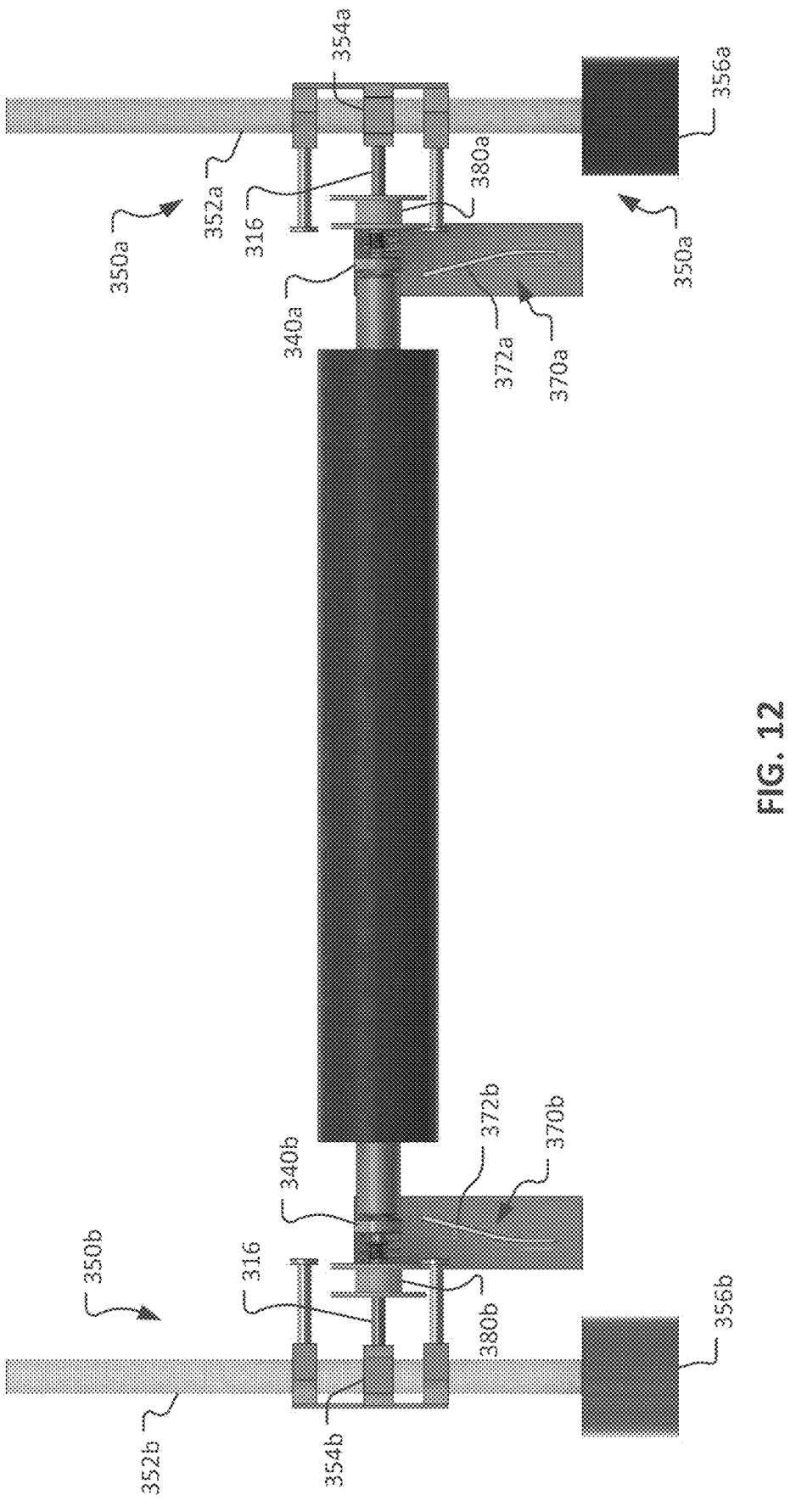
FIG. 12 illustrates a portion of the material handling system of FIG. 9.
Figures 13, 14:
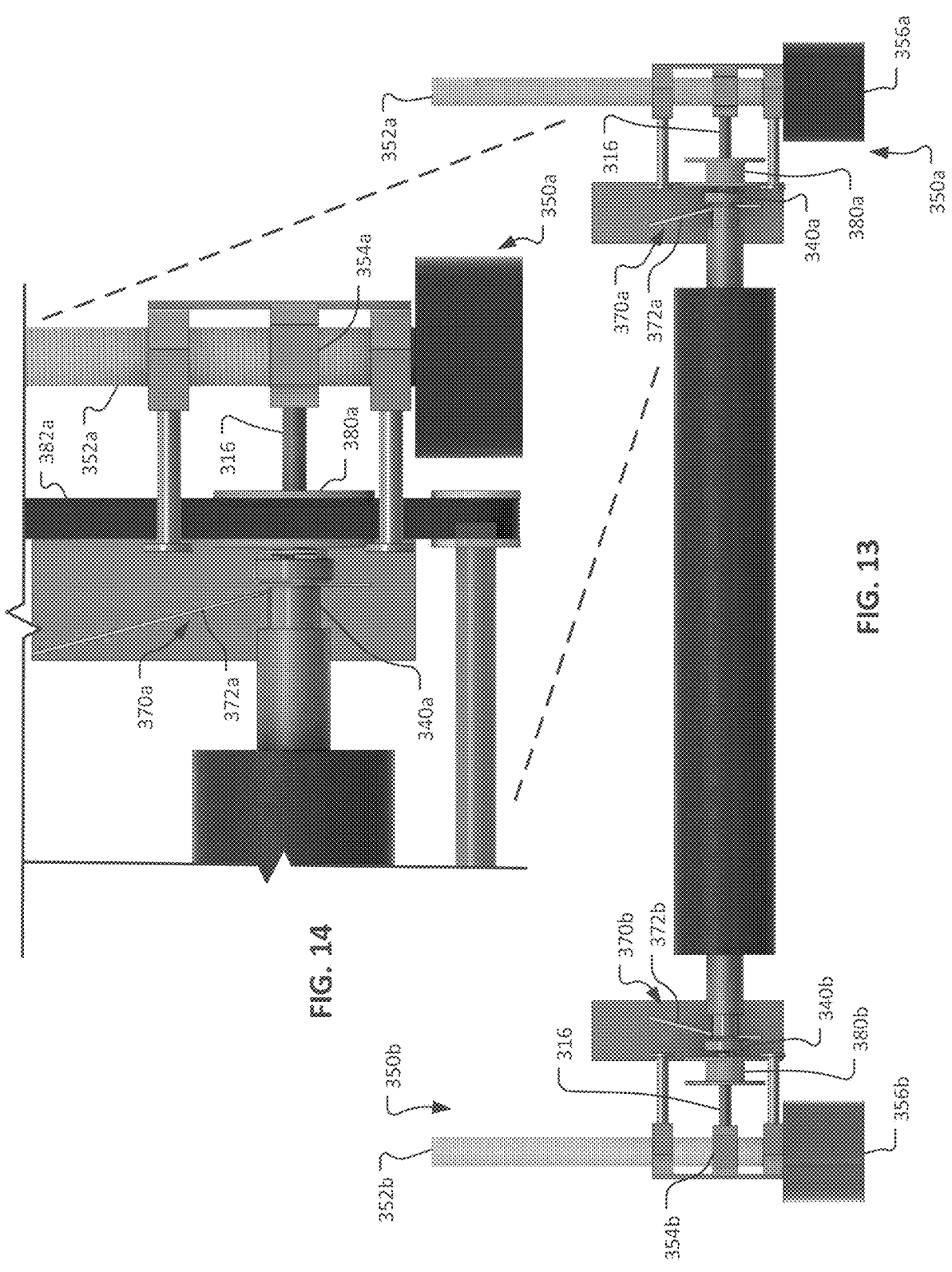
FIG. 13 illustrates the portion of the material handling system of FIG. 13 in a home position.
FIG. 14 is an enlarged view of an end of the portion of the material handling system of FIG. 13.

As best seen in FIGS. 12-14, in the depicted embodiment the linear actuator 350a/b includes a leadscrew 352a/b, a nut 354a/b, and a second motor 356a/b. The second motor 356a/b can be activated to drive rotations of the leadscrew 352a/b. In some embodiments, the second motor 356a/b can be a stepper motor or any other suitable type of rotary actuator. The nut 354a/b is in threaded engagement with the threads of the leadscrew 352a/b. The nut 354a/b is also rotatably coupled to the first axle 316. Accordingly, when the second motor 356a/b is activated to drive rotations of the leadscrew 352a/b, the nut 354a/b moves along the leadscrew 352a/b and causes the first axle 316 to raise or lower (as indicated by the arrow 142). In some embodiments, other types of linear actuators can be used rather than the leadscrews and nuts of the depicted linear actuator 350a/b.

Next, the mechanism that is used to change (e.g., to pivot) the tilt of the conveyor 310 will be described. As best seen in FIGS. 12-16, in the depicted embodiment, the first axle 316 is coupled to the frame 312 via the one or more clutches 340a/b. The clutch 340 a/b can be positioned relative to the first axle 316 in either: (i) an activated configuration/position or (ii) a deactivated configuration/position, as described further below.

When the clutch 340a/b is activated, the clutch 340a/b causes the first axle 316 to be rigidly coupled to the frame 312. In such a case, a rotation of the first axle 316 results in the tilting of the frame 312 (as indicated by the arrow 141 in FIG. 9). In contrast, when the clutches 340a/b are deactivated, the first axle 316 is rotatably coupled to the frame 312. That is, the first axle 316 rotates in relation to the frame 312. In such a case, rotation of the first axle 316 results in driving rotation of the first conveyor roller 314 and, in turn, driving of the conveyor belt 311 (as indicated by the arrow 143) without effecting the angular orientation or tilt angle of the frame 312.

As stated above, the material handling system 300 includes the first motor 330. The first motor 330 can be any suitable type of electric or hydraulic motor including, but not limited to, a low KV brushless DC drive motor (e.g., 500-750 kv driven from a standard PWM based variable speed Hall sensor brushless Electronic Speed Control). While the depicted embodiment of the material handling system 300 includes just one first motor 330, in some embodiments two such motors are included.

The material handling system 300 includes a drive train via which the first motor 330 can drive rotations of the first axle 316. In the depicted non-limiting arrangement, the first motor 330 (e.g., refer to FIG. 10) drives a belt 331 that, in turn, drives a shaft 332. The shaft 332, in turn, drives a first drive belt 382*a* and a second drive belt 382*b* (collectively referred to as "drive belt 382*a/b*"). The drive belt 382*a/b* can be a timing belt or synchro belt, for example. In some embodiments, the drive belt 382*a/b* can be a chain. The drive belt 382*a/b*, in turn, drives a first axle pulley 380*a* and a second axle pulley 380*b* (collectively referred to as "axle pulley 380*a/b*"). The drive belt 382*a/b* also drives rotations of a first idler pulley 384*a* and a second idler pulley 384*b* (collectively referred to as "idler pulley 384*a/b*"). The axle pulley 380*a/b* is rigidly coupled to the first axle 316. Accordingly, the first motor 330 drives rotations of the first axle 316 via the belt 331, the shaft 332, the drive belt 382*a/b*, and the axle pulley 380*a/b*. Of course, other drive train arrangements that result in driving rotations of the first axle 316 are also envisioned and encompassed in the scope of this disclosure.

Figure 15:
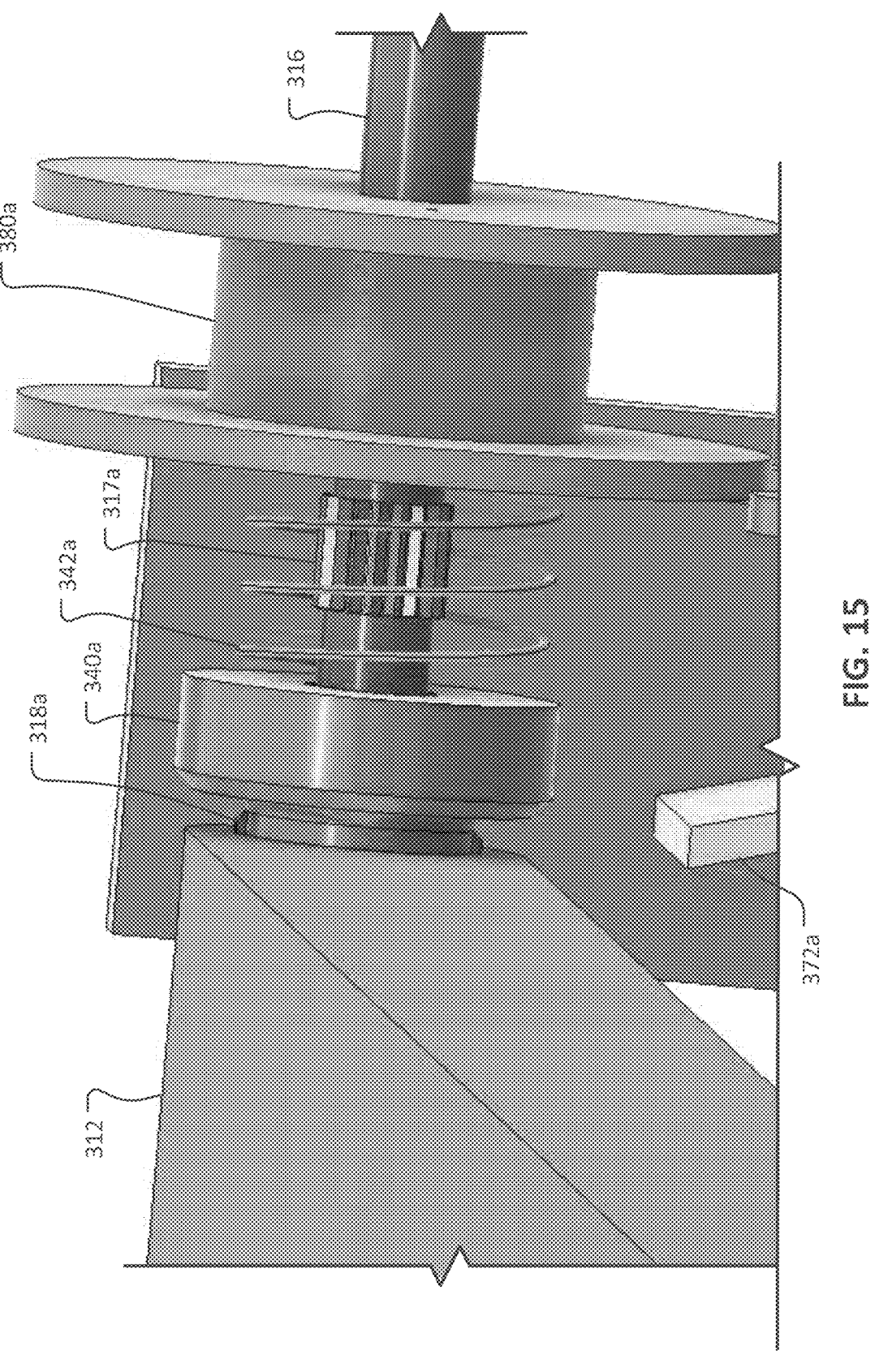
FIG. 15 is another enlarged view of an end of the portion of the material handling system of FIG. 13.
Figure 16:
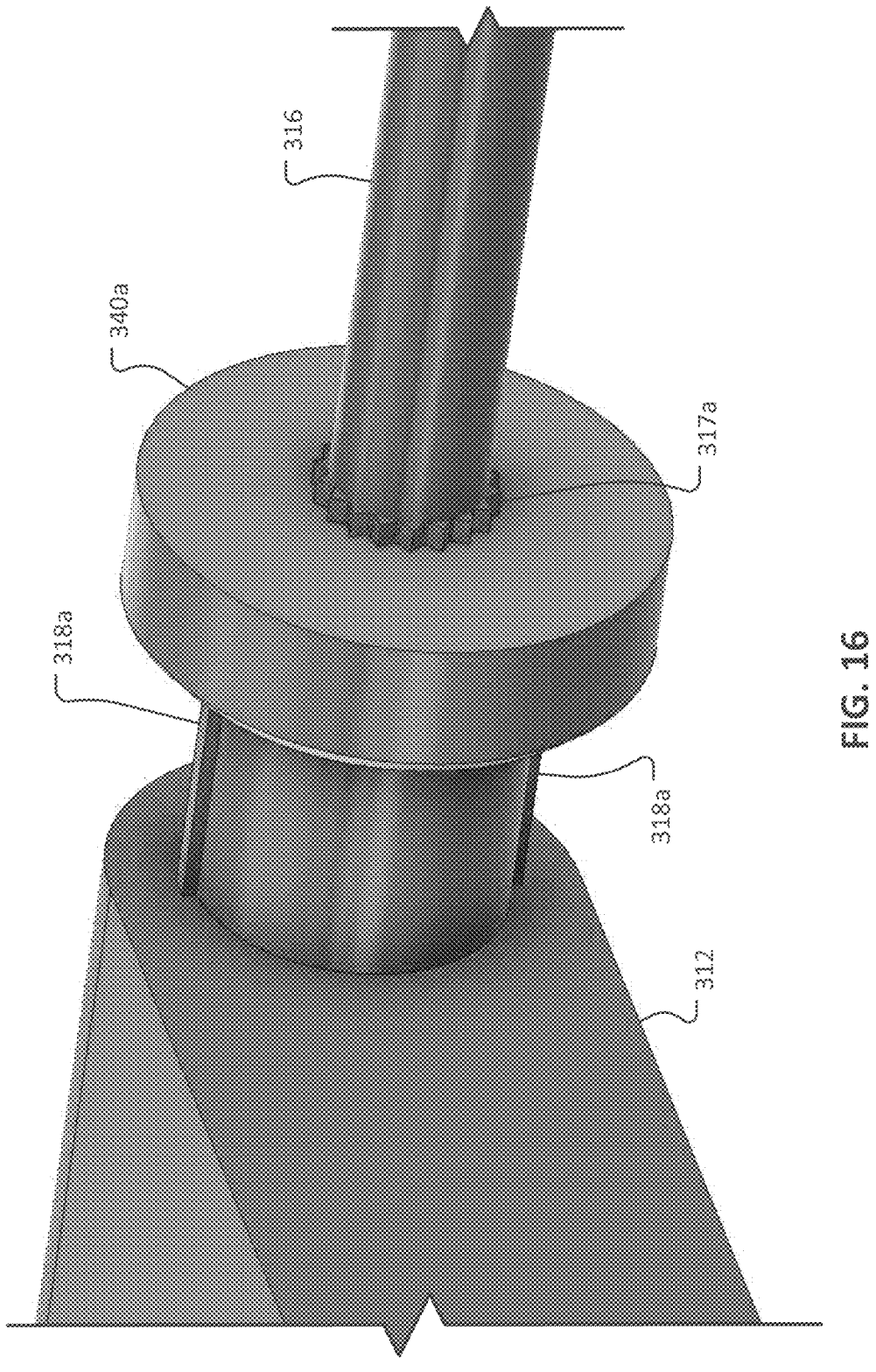
FIG. 16 is another enlarged view of an end of the portion of the material handling system of FIG. 13.

The material handling system 300 can also include a first clutch activation mechanism 370*a* and a second clutch activation mechanism 370*b* (collectively referred to as "clutch activation mechanism 370*a/b*"). The clutch activation mechanism 370*a/b* causes the clutch 340*a/b* to become either activated or deactivated by forcing the clutch 340*a/b* to slide along the first axle 316. In FIGS. 13, 14, and 16, the clutch 340*a/b* is shown in the activated configuration/position. In FIGS. 12 and 15, the clutch 340*a/b* is shown in the deactivated configuration/position.

In the depicted example, the clutch 340*a/b* is coupled to the frame 312 via a key 318*a/b* and keyway coupling arrangement (e.g., as visible in FIGS. 15 and 16). Accordingly, the clutch 340*a/b* can be slid along the first axle 316 by the clutch activation mechanism 370*a/b* while remaining rotatably coupled to the frame 312 and mechanically capable of driving tilting motions of the frame 312 (as indicated by the arrow 141 in FIG. 9).

In the depicted example, the first axle 316 includes a spline 317*a/b*. The bore of the clutch 340*a/b* is configured to slidably couple with the spline 317*a/b* and to decouple from the spline 317*a/b* as the clutch 340*a/b* is forced to slide along the first axle 316 by the clutch activation mechanism 370*a/b* between the activated and deactivated positions, respectively.

When the clutch 340*a/b* is in the activated configuration/position, the clutch 340*a/b* is coupled with the spline 317*a/b* (e.g., see FIGS. 13, 14, and 16). Accordingly, rotation of the first axle 316 causes tilting of the frame 312 via the spline 317*a/b*, the clutch 340*a/b*, the key 318*a/b*, and the keyway of the frame 312. Rotation of the first axle 316 also causes rotation of the first conveyor roller 314 (which rotates in synchronous combination with the tilting of the frame 312).

When the clutch 340*a/b* is in the deactivated configuration/position, the clutch 340*a/b* is uncoupled from the spline 317*a/b* (e.g., see FIGS. 12 and 15). Accordingly, rotation of the first axle 316 has no effect on the frame 312 because the first axle 316 freewheels in relation to the clutch 340*a/b*. However, rotation of the first axle 316 does cause rotation of the first conveyor roller 314 when the clutch 340*a/b* is in the deactivated configuration/position. Such rotations of the first conveyor roller 314 drive the conveyor belt 311.

The clutch 340*a/b* also includes a spring 342*a/b* (e.g., see FIG. 15). The spring 342*a/b* biases the clutch 340*a/b* to its disengaged configuration in which the clutch 340*a/b* is uncoupled from the spline 317*a/b*.

The clutch activation mechanism 370*a/b* causes the clutch 340*a/b* to become activated as the frame 312 is lowered by the linear actuator 350*a/b* to its home position (e.g., as shown in FIGS. 9, 10, 13, and 14). In the depicted embodiment, the home position is the lower end of travel position of the first axle 316. However, in some embodiments the home position in which the clutch 340*a/b* is activated is at one or more positions other than, or in addition to, the lower end of travel position.

As the linear actuator 350*a/b* raises the first axle 316 from the home position, the clutch activation mechanism 370*a/b* causes the clutch 340*a/b* to become deactivated. Hence, when the first axle 316 is in the home position, activation of the first motor 330 will cause the conveyor 310 to change its tilt angle. However, when the first axle 316 is not in the home position, activation of the first motor 330 will cause the conveyor belt 311 to move without causing the conveyor 310 to change its tilt angle.

In the depicted embodiment, the clutch activation mechanism 370*a/b* includes a clutch guide 372*a/b* (e.g., see FIGS. 12-15). The clutch guide 372*a/b* is a ramp device that engages with the clutch 340*a/b* and applies force to the clutch 340*a/b* to move the clutch 340*a/b* along the first axle 316. The clutch guide 372*a/b* moves the clutch 340*a/b* to its activated position as the first axle 316 is moved (lowered) into the home position by the linear actuator 350*a/b*.

In some embodiments, the clutch 340*a/b* defines an annular groove that receives and slidably engages with portions of the clutch guide 372*a/b*. For example, in FIG. 12, the clutch 340*a/b* is in its deactivated position. Then, as the first axle 316 is lowered by the linear actuator 350*a/b* toward its home position, the clutch guide 372*a/b* engages with the groove of the clutch 340*a/b*. As the first axle 316 is lowered still farther, the ramp nature of the clutch guide 372*a/b* forces the clutch 340*a/b* to gradually slide outward along the first axle 316 toward the axle pulley 380*a/b* (as shown in FIGS. 13 and 14) where the clutch 340*a/b* eventually becomes engaged with the spline 317*a/b*. The clutch 340*a/b* thereby becomes positioned in its activated position when the first axle 316 reaches its home position.

With the clutch 340*a/b* in its activated position, the first motor 330 can drive tilting movements of the frame 312. The tilting movements can be ceased at any time to position the conveyor 310 at any designed angle. In some embodiments, this tilting movement functionality is used for releasably engaging the conveyor attachment arms 313 to an adjacent structure as desired (e.g., see FIG. 11).

In some embodiments, the conveyor 310 has a storage position in which the conveyor 310 is essentially vertically oriented. That is, with the first axle 316 in its home position, the opposite end of the conveyor 310 can be tilted upward until the conveyor 310 is extending essentially vertically. In such an arrangement, the second conveyor roller 315 is vertically above the first conveyor roller 314. In some embodiments, the material handling system 300 can include a latch mechanism (e.g., solenoid or other type of automated latching device) that releasably secures the conveyor 310 in the vertically oriented storage position.

To disengage or deactivate the clutch 340*a/b*, the first axle 316 is raised by the linear actuator 350*a/b* away from its home position. The ramp nature of the clutch guide 372*a/b* forces the clutch 340*a/b* to slide inward along the first axle 316 toward the frame 312 (as shown in FIGS. 12 and 15) where the clutch 340*a/b* eventually becomes disengaged from the spline 317*a/b*. Accordingly, with the clutch 340*a/b* in its deactivated position, activation of the first motor 330 will cause the first axle 316 to drive the first conveyor roller 314 and the conveyor belt 311 (without causing any tilting movements of the frame 312).

Figure 17:
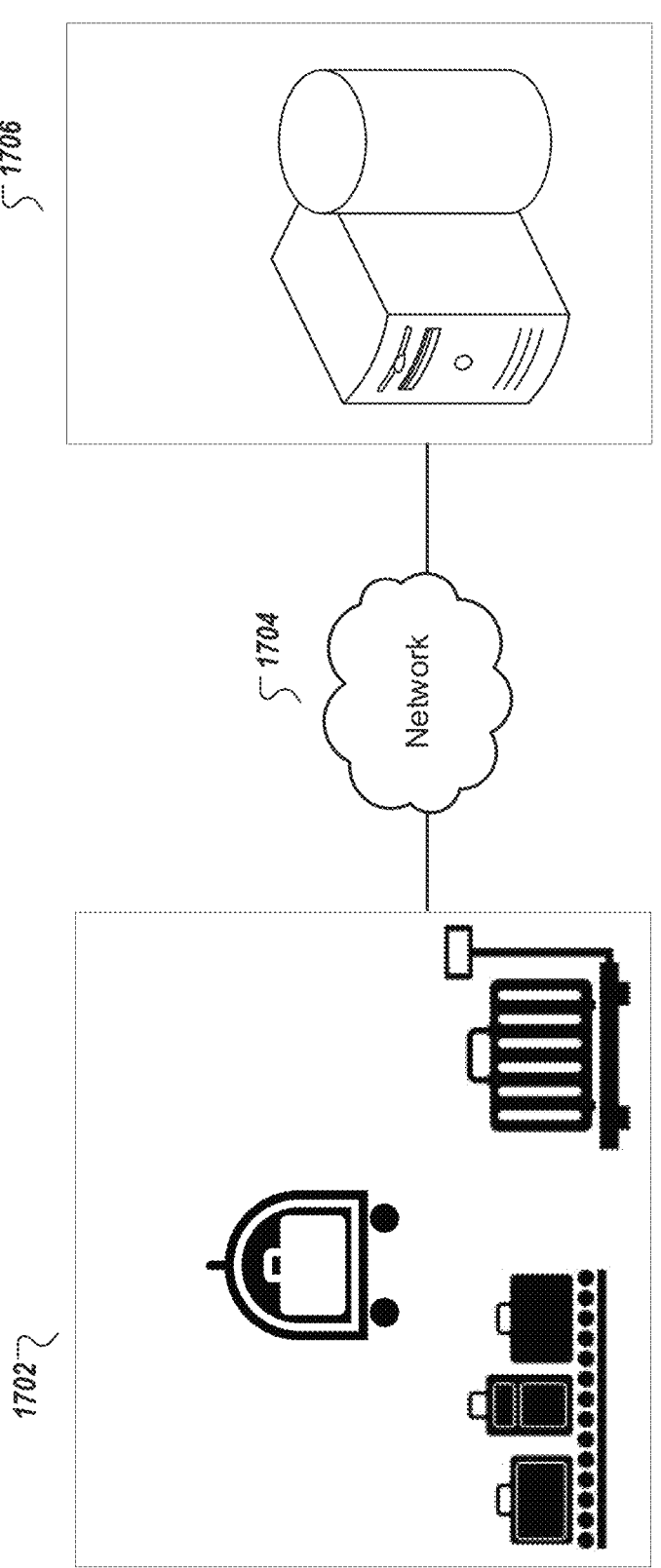
FIG. 17 is an example environment for baggage handling management and control.

FIG. 17 is an example environment 1700 for baggage handling management and control. The example environment 1700 includes a baggage handling system 1702, a network 104, and a baggage handling management and control logistics system (also referred to as control system) 1706.

The baggage handling system 1702 communicate with the control system 1706 over the network 1704. The baggage handling system 1702 can include a plurality of devices for checking and transporting baggage, and include a number of different processes and checks. For example, the baggage handling system 1702 can include multiple baggage handling carts (also referred to as carts) and conveyor systems. The carts can communicate with the control system 1706 to load baggage and transport the baggage into certain locations. The conveyor systems can include one or more cameras that can scan the baggage that is transported, and send the scanned data of bags to the control system 1706. The baggage handling system 1702 can include a check-in device that can scan the baggage and obtain images of the baggage that can be used to generate tagless ID for the baggage. The baggage handling system 1702 can communicate with the control system 1706 to count bags, check weights of bags, balance loads, screen suitcases for security reasons, transport bags through a conveyer belt system, read bag information automatically.

In some examples, the network 1704 includes a local area network (LAN), wide area network (WAN), the Internet, or a combination thereof, and connects the baggage handling system 1702 and the control systems 1706. In some examples, the network 1704 can be accessed over a wired and/or a wireless communication link.

The control system 1706 can include at least one server and data store, e.g., database. The control system 1706 can instruct one or more carts in the baggage handling system 1702 to move baggage located in a certain location to a destination. The control system 1706 can receive scanned data of the baggage from cameras at different scan points in the baggage handling system 1702. The control system 1706 can monitor and track the baggage that is transported. The control system 1706 can receive locations of the carts as the carts begin navigation to the destination. So that the control system 1706 can monitor and track the locations of the carts and the list of bags inside the carts. The control system 1706 can also receive scanned data, such as image data of bags from a check-in device and generate tagless ID for the bags. The control system 1706 can recognize and track the tagless bags during the transportation of the bags based on scanned data of the bags at different scan points in the baggage handling system 1702. FIGS. 18-20 and associated descriptions provide additional details of these implementations.

FIG. 18 is an example flow process 1800 of moving baggage to a destination. The example process 1800 can be implemented by the control system 1706 shown in FIG. 17. In some examples, the example process 1800 is provided using one or more computer-executable programs executed by one or more computing devices.

At step 1802, the control system can broadcast a request that indicates a need for a number of carts at a certain location.

For example, the control system can receive a notification that baggage for a certain flight, e.g., flight 123, is checked in at a counter and ingested into the baggage handling system. The control system can determine that the baggage for flight 123 is located in a certain location, e.g., pier 5, for loading into a cart.

The control system can receive the number of bags to be routed to the destination. In some examples, the control system can receive the number of bags from the baggage handling system that tags the bags. The control system can determine the number of carts needed to transport the bags, based on the number of bags. In some examples, the control system can receive other attributes of the bags, such as the size of the bags, the weight of the bags, and the like. In some examples, the control system can receive the images of the bags, which are captured by the baggage handling system at the check-in point. The control system can determine the number of carts needed based on the various attributes of the bags.

In some implementations, the baggage handling system can determine the number of carts based on the number of bags, the size of the bags, the weight of the bags, and the like. The baggage handling system can notify the control system of the number of needed carts.

Assuming that the control system determines that two carts are needed, the control system can broadcast the request indicating that two carts are needed at the baggage location, e.g., pier 5, for transporting the bags for flight 123.

The carts can receive the broadcast from the control system. Each cart can determine whether it is the closest empty/parked cart to the location of the baggage, such as pier 5. The carts can determine the distance from its current location to the baggage location using positioning technologies, such as global positioning system (GPS). In some implementations, the cart can determine whether it is the closest empty/parked cart to the baggage location through cart to cart communication. For example, cart A can determine that it is the closest cart to the baggage location. Cart B can determine that it is the second closest cart to the baggage location. Cart A and cart B can separately send or broadcast confirmation that they are accepting the request and proceeding to the baggage location, to the control system and the rest of the cart fleet. In some implementations, the carts accepting the request can be empty carts that are located within a distance threshold of the baggage location.

At step 1804, the control system can receive the confirmation from one or more carts that accept the request and send instructions to instruct the one or more carts to navigate to the baggage location. For example, after cart A and cart B separately broadcast their confirmation, the control system can receive their confirmations and instruct the carts to navigate to the baggage location.

In some implementations, the control system can receive each cart's location from the cart. The control system can determine which carts are closest to the baggage location.

The control system can send the request to the closet carts and instruct the closest carts to go to the baggage location.

Carts A and B can move to the baggage location, e.g., pier 5, park itself at the load point at pier 5, and lower its door conveyor until the catch hooks are on the pier and sense the door conveyor is latched and ready to receive bags. The conveyor can be started and powered to roll bags up as the conveyor senses the bags on the conveyor belt.

At step 1806, the control system can receive, from a scanner of the baggage handling system, the scanned data of the baggage that is loaded into the carts assigned to transport the baggage.

Scanner at pier 5 load point 1 can begin scanning the bags as the bags are conveyed through the pier. Bags destined for flight 123 can be pushed by the pier's pusher under load point 1 scanner to the cart's door conveyor. The control system can receive the data of the bags that are scanned and pushed into the carts. The scanned data of the bag can include the bag ID, the date, the time, and destination of the bags, and the like. The control system can receive the bag data through broadcast from the scanner of the baggage handling system, as the bags are scanned and pushed to the door conveyor of the carts. The control system can store bag data in a database of the control system.

In some implementations, the cart can send a message to the control system when it arrives at the baggage location and starts receiving bags. The control system can associate the scanned bag data with the cart ID that is receiving the bags. So that the control system can obtain a list of bags that are loaded into each cart.

As the bags are being loaded into the carts, the carts can receive the bag data from the control system and store a local copy of the bag data, such as the bag ID, the date, the time, and destination of the bags, and the like. Based on the bag data of the scanned bags, the control system can determine whether all the bags are scanned and loaded into the carts. The bags can be scanned at different scan points of the baggage handling system. Based on scanned bag data, the control system can also track the bags that are scanned.

After the bags are pushed to the door conveyor of the cart (e.g., cart A or cart B), the door conveyor of the cart can roll the bags into the cart and arrange the bags in the cart. For example, as the bags are conveyed into the cart, vision sensors or cameras in the ceiling of the cart can see the bags entering the cart in real time, and work with level sensing information from the door conveyor to decide where the bag should be pushed/moved into, e.g., an open spot.

Carts A and B can include a central processing unit (CPU) and/or a vision system that instruct the robotic arm and/or OMNI rollers (e.g., conveyor ball) in the floor of the carts to assist in moving the newly delivered bags from the door conveyor to an area within the carts. So that a similar sized gap in the current layer of the carts can be filled with the newly delivered bags. The functionality of the conveyor ball floor can be utilized in conjunction with the on-board vision system to increase the packing density of the baggage items in the baggage carts.

The cart door level/layer sensors can be utilized in conjunction with the on-board vision system to see if the current level/layer is full. If the current layer is full, the CPU or microcomputer of the carts can use the conveyor leadscrew elevation mechanism to raise the cart end of the door conveyor to a point above the current bag layer.

Once the door conveyor reaches a maximum layer of the cart, the cart (e.g., Cart A or Cart B) can broadcast a cart-full message back to the control system. The cart can also broadcast its location, the baggage destination, and lists of bags in its custody to the control system. The cart can broadcast the information periodically on a predetermined interval.

At step 1808, the control system can receive, from each cart, the cart-full message that indicates that the cart is full and the loading of the baggage to the cart is finished. The control system can determine the list of bags inside each cart. The list of bags inside each cart can be associated with a destination. For example, the bags are for flight 123. The control system can determine that the bags for flight 123 should be transported to a certain destination location, such as terminal T.

At step 1810, the control system can send instructions that instruct each cart to navigate to the destination of the baggage according to the lists of the bags inside the cart. The control system can determine that all the bags are loaded into a cart based on the scanned bag data received from the scanner of the baggage handling system. The control system can determine the destination, such as the terminal destination, of the bags for each cart based on the list of the bags inside the cart. The control system can send an instruction to the cart instructing the cart to navigate to the corresponding destination.

After receiving the instruction, the carts can begin navigation to the destination. In some implementations, the carts can periodically send its location to the control system in the process of navigation. So that the control system can monitor and track the locations of the cart as the cart is moving to the destination.

The order of steps in the process 1800 described above is illustrative only, and the process 1800 can be performed in different orders. In some implementations, the process 1800 can include additional steps, fewer steps, or some of the steps can be divided into multiple steps.

FIG. 19A is an example flow process 1900A for tagless bag identification (ID) generation. The example process 1900A can be implemented by the control system 1706 shown in FIG. 17. In some examples, the example process 1900A is provided using one or more computer-executable programs executed by one or more computing devices.

At step 1902, the control system can receive 3D image data of a bag and weight data of the bag.

When bags are checked in, the check-in device of the baggage handling system can scan the bag in 3D and weigh the bag. The check-in device of the baggage handling system can send the images and the weight of the bag to the control system over a network. The control system can receive the scanned bag data, e.g., 3D images of the bag, and the bag weight.

Figure 19B:
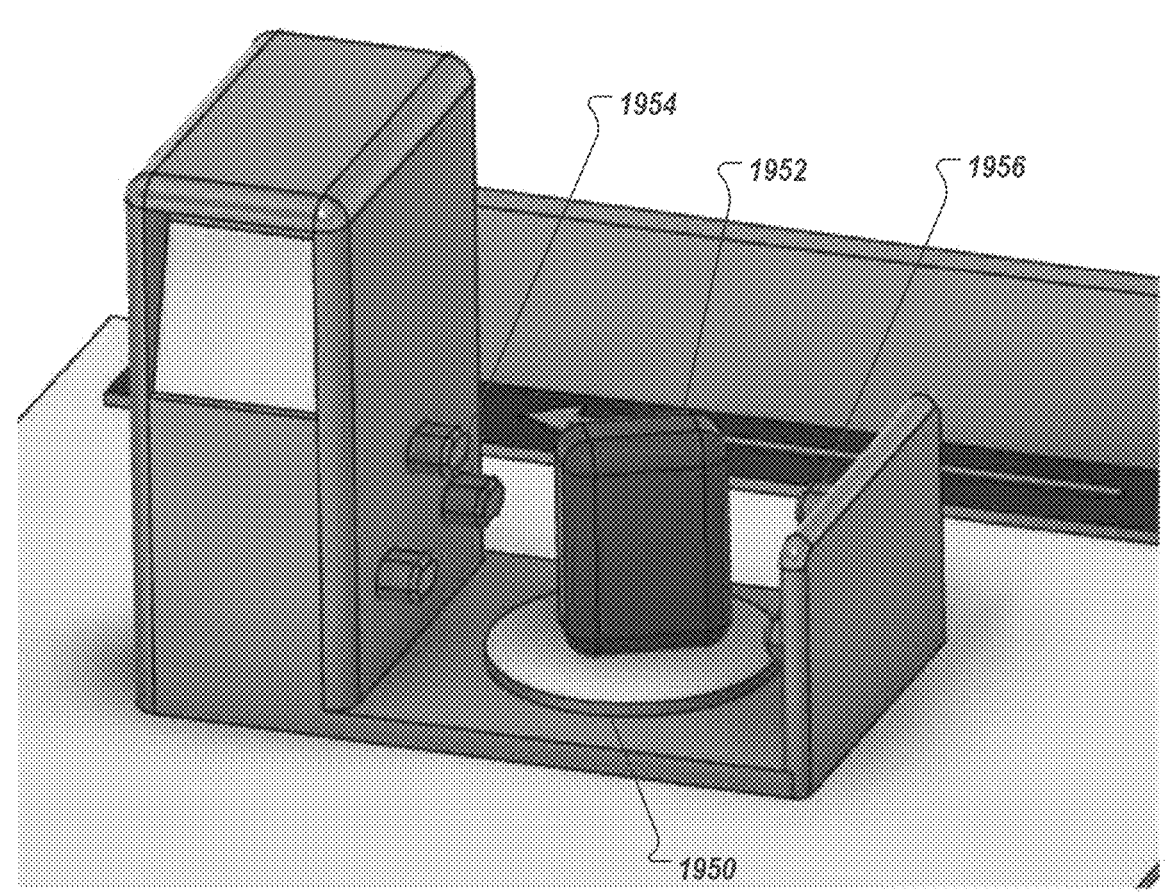
FIG. 19B is a check-in device used for tagless bag identification (ID) generation.

The baggage handling system can include a check-in device, such as a kiosk, that can scan the bags in three dimensions (3D) and weigh the bags. FIG. 19B is a check-in device 1800B used for tagless bag identification (ID) generation. The check-in device 1900B can include a scale plate 1950 that is rotational. When a bag 1952 is put on the scale plate 1950, the weight of the bag can be determined. The check-in device 1900B can also include multiple cameras 1954, 1956. The multiple cameras can be on two opposite sides. For example, the check-in device can include six cameras, with 3 cameras 1954 on one side of the check-in device, and the other 3 cameras 1956 on the other side. As the scale plate rotates, cameras on the check-in device can take images of the bag to obtain the 3D data of the bag.

The 3 cameras on opposite sides taking "triples" of the bag. The triples of the bag can include the 3 images from the 3 cameras on each side. The 6 camera array can take images of the bag every 5 degrees as the bag is rotated on the rotational scale plate. The check-in device can capture 72 sets images of the bag. Each set of the images can include 2 triples, e.g., a first triple including 3 images from the 3 cameras one side of the check-in device, and a second triple including 3 images from the 3 cameras on the other side of the check-in device. As a result, the control system can receive 144 image triples.

At step 1904, the control system can generate a data array including volumetric calculations of the bag. In some implementations the control system will take multiple readings of the bag from different angles using multiple cameras while having the bag rotated on the scale plate 1950. The control system can take measurements of the bag based on the image triples of the bag to generate the volumetric calculation. The volumetric calculations can include measured length, width, and height. In some implementations, the measured length, width, and height can be averaged over the multiple measured values for each across all the measurements from all of the different 3D images. For example, all of the width measurements of the bag can be averaged to create a value for average width, the high and low values from the width measurements can be used for High/Low width values.

From the values for each measurement of length, width, and height, the volumetric calculations can further include a low calculation derived from the lowest measured value for that dimension, a high calculation derived from the highest measured value for that dimension, and high/low delta which is derived from the difference (subtractive) of the highest minus the lowest values (High–Low=Delta). As a result, the control system can obtain volumetric data points that are calculated using standard geometric calculations of (Length x Width x Height) in multiples including a low, high, average, and high/low delta calculation for each bag. The control system can generate a data array for the volumetric data points. For example, the data array for the volumetric data points can be (lowest volume calculated, highest volume calculated, average volume calculated, and delta–the volume calculated based on the difference between high and low values), which is also referred to as (low, high, average, and delta).

The control system can process volumetric calculations for each image triple using standard focal length distancing and standard camera distancing separation to take measurements of the bag. As discussed above, the control system can receive 144 image triples. The control system can obtain the volumetric calculation for each bag using the 144 image triples.

At step 1906, the control system can generate an image feature vector using a set of features extracted from 3D images of the bag.

The control system can extract the set of features using image analytic. The set of features can include non-standard features, such as colors, handkerchiefs, tags, wheel type, etc. The control system can generate the image feature vector using standard image analytics, such as a machine learning and artificial intelligence model. In some implementations, the set of features can be matched between images to identify the most easily spot-able unique feature.

At step 1908, the control system can generate a unique ID for the bag using the data array and the image feature vector.

In some implementations, the control system can hash the data array and the image feature vector separately using a predetermined hash algorithm. For example, the hash algorithm can be MD5 or Whirlpool hashing algorithms. The control system can concatenate the resulting hashes to obtain a concatenated result. The control system can perform hash again on the concatenated result to create the unique ID for the bag.

The control system can store the unique ID, the data array, and the image feature vector into a database to create a bag ID. The control system can associate the bag ID with passenger name and flight details.

In some other implementations, the control system can pair the image feature vector with each value individually in the data array. For example, assuming the image feature vector is represented by IFV, the data array for the volumetric data points is represented by (low, high, average, and delta), and the pairing array can be (IFVlow, IFVhigh, IFVaverage, IFVdelta). The control system can hash each value in the pairing array to obtain a corresponding hash result. The control system can generate, as the ID of the bag, an ID array including each hash result. For example, the combination of the hash results can be the ID array that is used as the ID for the bag. In other words, each hash result can be an element of the ID array.

The control system can store the ID array into a database to create a bag ID. The control system can associate the bag ID with passenger name and flight details.

The order of steps in the process 1900A described above is illustrative only, and the process 1900A can be performed in different orders. In some implementations, the process 1900A can include additional steps, fewer steps, or some of the steps can be divided into multiple steps.

FIG. 20A is an example flow process 2000A for tagless baggage recognition and tracking in one implementation. The example process 2000A can be implemented by the control system 1706 shown in FIG. 17. In some examples, the example process 2000A is provided using one or more computer-executable programs executed by one or more computing devices.

At step 2002, the control system can receive scan data of a bag from a scan point in the baggage handling system. The scan data can include 3D images of the bag. As the bag is transported from the check-in location to a destination, the bag can be scanned at different scan points. The control system can receive the scan data of the bag from each scan device at the scan point. For example, subsequent scans of the bag can be performed in different parts of the airport, bag systems, or other areas using camera triples. The camera triples can be three cameras that each capture an image of the bag to obtain image triples. The scan data can be the image triples. The control system can receive the image triples from the camera triples at each scan point.

At step 2004, the control system can perform volumetric calculation based on the 3D images, such as the image triples. As discussed above, the volumetric calculations can include measured length, width, and height of the bag. The control system can process volumetric calculations for each image triple using standard focal length distancing and standard camera distancing separation to take measurements of the bag. In some implementations, the control system can receive the weight of the bag.

At step 2006, the control system can analyze the 3D images, such as the image triples, to determine the image feature vector. The control system can extract the set of features using image analytics. The set of features can include non-standard features, such as colors, handkerchiefs, tags, wheel type, etc. The control system can generate the image feature vector using standard image analytics, such as a machine learning and artificial intelligence model. In some implementations, the set of features can be matched between images to identify the most easily spot-able unique feature.

At step 2008, the control system can compare the volumetric calculation of the bag with bag data stored in a database to identify a set of possible match bags.

The bag data stored in the database can include the volumetric calculations of bags previously checked in and stored in the database. The control system can create a time band filter numeric for the bag. The time band filter numeric can be a time window for narrowing down the data set of the possible match bags. For example, the control system can compare the volumetric calculation of the bag with bag data of bags that are checked in within a certain time threshold, e.g., within two hours of the time when the bag is scanned. The control system can determine the time window or the time threshold for the time band filter numeric based on the time the bags are checked in and the subsequent connecting flights on schedule.

By comparing the volumetric calculation of the bag with the bag data stored in the database within the time band filter, the control system can determine a set of possible match bags.

At step 2010, the control system can further identify the match bag, from the set of possible match bags, using the image feature vector. The control system can further use the image feature vector to reduce the data set of the possible match bags. For example, the control system can compare the image feature vector of the scanned bag with the image feature vectors of possible match bags to identify the match In other words, the control system can determine the ID of the tagless bag that is scanned.

At step 2012, the control system can update the database with the bag. As a result, the control system can recognize the tagless bag that is scanned at the scan point. tracking information of the bag.

For example, the tracking information of the bag can include the bag ID, the date/timestamp, and location of the scanned bag. The location of the scanned bag can be the location of the scan point where the bag is scanned. The tracking information of the bag can indicate that the particular bag is seen/scanned at a particular scan point. As a result, the control system can track the tagless bag that is transported and scanned at different points of the airport or other systems.

The order of steps in the process 2000A described above is illustrative only, and the process 2000A can be performed in different orders. In some implementations, the process 2000A can include additional steps, fewer steps, or some of the steps can be divided into multiple steps.

FIG. 20B is an example flow process 2000B for tagless baggage recognition and tracking in another implementation. The example process 2000B can be implemented by the control system 1706 shown in FIG. 17. In some examples, the example process 2000B is provided using one or more computer-executable programs executed by one or more computing devices.

At step 2052, the control system can receive scan data of a bag from a scan point in the baggage handling system. This step is similar to step 2002.

At step 2054, the control system can perform volumetric calculation based on the image triples. This step is similar to step 2004.

At step 2056, the control system can analyze the image triples to determine the image feature vector. This step is similar to step 2006.

At step 2058, the control system can calculate a scan ID array based on the volumetric calculation and the image feature vector. The scan ID array can include a plurality of scan hashes for the scanned bag.

As discussed above, assuming the image feature vector is represented by IFV, the volumetric calculation is represented by (low, high, average, and delta), the control system can determine the pairing array as (IFVlow, IFVhigh, IFVaverage, IFVdelta). The control system can hash each value in the pairing array to obtain a corresponding scan hash. The combination of the scan hash can be the scan ID array. In other words, each scan hash can be an element of the scan ID array.

At step 2060, the control system can determine a similarity coefficient for each scan hash included in the scan ID array by comparing the scan hash with a corresponding hash in the bag ID array of each bag stored in the database.

The control system can apply the time band filter for the comparison between the scan hash and the stored hashes. For example, the control system can compare the scan hash with the stored hashes in the bag arrays of bags that are checked in with the time band filter.

As discussed above, each bag is associated with an ID array including a plurality of hashes, e.g., 4 hashes. The control system can compare the scan ID array of the bag with the stored ID arrays of the recorded bags. For example, the control system can compare each scan hash of the scanned bag with each stored hash of each recorded bag.

At step 2062, the control system can determine a valid match for a scan hash in response to determining that the similarity coefficient for the scan hash satisfies a hash similarity threshold.

The similarity coefficient for the scan hash can indicate the level of similarity between the scanned bag and the bags recorded in the database. In some implementations, the similarity coefficient can be a Jaccard similarity coefficient. If the similarity coefficient satisfies a hash similarity threshold, the control system can determine that the scan hash has a valid match.

The hash similarity threshold can be specific to a particular scan point. In some implementations, the control system can train a machine learning model to determine the optimal similarity threshold for each scan point. For example, the control system can input a training dataset that includes a set of similarity coefficients and their corresponding labels indicating "match" or "failure" (e.g., "mismatch") into the machine learning model to train the machine learning model. The trained machine learning model is associated with a particular scan point, such as an ID of the scan point. The training dataset can include data points from the particular scan point. The machine learning model can include a long-term statistical analysis system. The output of the trained machine learning model can be the hash similarity threshold for the particular scan point.

The control system can periodically update the hash similarity threshold using the trained machine learning model to optimize the scanning and improve speed of detection of valid match of scan hash over time.

At step 2064, the control system can identify a match bag based on that the number of valid hash matches satisfy a matching threshold.

For example, the ID array of each bag includes 4 hashes. The matching threshold can be 2. In other words, if there are two or more valid matches in the ID array, the control system can determine that the scanned bag matches a particular stored bag.

At step 2066, the control system can update the database with the tracking information of the bag. For example, the tracking information of the bag can include the bag ID, the data/timestamp, and location of the scanned bag. This step is similar to step 2012.

The order of steps in the process 2000B described above is illustrative only, and the process 2000B can be performed in different orders. In some implementations, the process 2000B can include additional steps, fewer steps, or some of the steps can be divided into multiple steps.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method comprising:
    broadcasting, by one or more computing devices, a request that indicates a need for a number of carts at a location;
    receiving confirmation from one or more carts that accept the request, the one or more carts are carts that are close to the location;
    sending instructions to the one or more carts instructing the one or more carts to navigate to the location;
    receiving, from a scanner of a baggage handling system, scanned data of baggage that is loaded into the one or more carts assigned to transport the baggage;
    receiving, from each of the one or more carts, a message indicating the cart is full;
    sending instructions to each cart to navigate to a destination of the baggage according to a list of bags inside each cart;
    receiving three-dimension (3D) images of a bag;
    generating, using the 3D images of the bag, a data array including volumetric calculations of the bag;
    generating an image feature vector using a set of features extracted from the 3D images of the bag; and
    generating a unique identifier (ID) for the bag using the data array and the image feature vector, wherein generating the unique ID for the bag comprises:
        hashing the data array and the image feature vector separately to obtain resulting hashes;
        concatenating the resulting hashes to obtain a concatenated result; and
        hashing the concatenated result to create the unique ID for the bag.

2. The computer-implemented method of claim 1, wherein the volumetric calculations of the bag include average values of length, width, and height of the bag.

3. The computer-implemented method of claim 1, comprising:
    comparing the volumetric calculation of the bag with bag data stored in a database to identify a set of possible match bags;
    identifying a match bag, from the set of possible match bags, using the image feature vector; and
    updating the database with tracking information of the bag, wherein the tracking information comprises the ID of the match bag, a timestamp, and a location of the scan point.

4. The computer-implemented method of claim 1, wherein generating the unique ID for the bag comprises:
    pairing the image feature vector with each value individually in the data array to obtain a pairing array;

hashing each value in the pairing array to obtain a corresponding hash result; and
    generating, as the ID of the bag, an ID array including each hash result.

5. The computer-implemented method of claim 4, comprising:
    calculating a scan ID array based on the volumetric calculation and the image feature vector, wherein the scan ID array includes a plurality of scan hashes for the bag;
    determining a similarity coefficient for each scan hash included in the scan ID array by comparing the scan hash with a corresponding hash in the ID array of each bag stored in a database;
    determining a valid match for a scan hash in response to determining that the similarity coefficient for the scan hash satisfies a hash similarity threshold;
    identifying a match bag based on that a number of valid hash matches between the scan ID array and the ID array of the match bag satisfies a matching threshold; and
    updating the database with tracking information of the bag, wherein the tracking information comprises the ID of the match bag, a timestamp, and a location of the scan point.

6. One or more non-transitory computer-readable storage media coupled to one or more processors and having instructions stored thereon which, when executed by the one or more processors, cause the one or more processors to perform operations comprising:
    broadcasting, by one or more computing devices, a request that indicates a need for a number of carts at a location;
    receiving confirmation from one or more carts that accept the request, the one or more carts are carts that are close to the location;
    sending instructions to the one or more carts instructing the one or more carts to navigate to the location;
    receiving, from a scanner of a baggage handling system, scanned data of baggage that is loaded into the one or more carts assigned to transport the baggage;
    receiving, from each of the one or more carts, a message indicating the cart is full;
    sending instructions to each cart to navigate to a destination of the baggage according to a list of bags inside each cart;
    receiving three-dimension (3D) images of a bag;
    generating, using the 3D images of the bag, a data array including volumetric calculations of the bag;
    generating an image feature vector using a set of features extracted from the 3D images of the bag; and
    generating a unique identifier (ID) for the bag using the data array and the image feature vector, wherein generating the unique ID for the bag comprises:
        hashing the data array and the image feature vector separately to obtain resulting hashes;
        concatenating the resulting hashes to obtain a concatenated result; and
        hashing the concatenated result to create the unique ID for the bag.

7. The one or more non-transitory computer-readable storage media of claim 6, wherein the volumetric calculations of the bag include average values of length, width, and height of the bag.

8. The one or more non-transitory computer-readable storage media of claim 6, wherein the operations comprise:

comparing the volumetric calculation of the bag with bag data stored in a database to identify a set of possible match bags;

identifying a match bag, from the set of possible match bags, using the image feature vector; and updating the database with tracking information of the bag, wherein the tracking information comprises the ID of the match bag, a timestamp, and a location of the scan point.

9. The one or more non-transitory computer-readable storage media of claim 6, wherein generating the unique ID for the bag comprises:

pairing the image feature vector with each value individually in the data array to obtain a pairing array;

hashing each value in the pairing array to obtain a corresponding hash result; and generating, as the ID of the bag, an ID array including each hash result.

10. The one or more non-transitory computer-readable storage media of claim 9, wherein the operations comprise:

calculating a scan ID array based on the volumetric calculation and the image feature vector, wherein the scan ID array includes a plurality of scan hashes for the bag;

determining a similarity coefficient for each scan hash included in the scan ID array by comparing the scan hash with a corresponding hash in the ID array of each bag stored in a database;

determining a valid match for a scan hash in response to determining that the similarity coefficient for the scan hash satisfies a hash similarity threshold;

identifying a match bag based on that a number of valid hash matches between the scan ID array and the ID array of the match bag satisfies a matching threshold; and updating the database with tracking information of the bag, wherein the tracking information comprises the ID of the match bag, a timestamp, and a location of the scan point.

11. A system, comprising:

one or more processors; and a computer-readable storage device coupled to the one or more processors and having instructions stored thereon which, when executed by the one or more processors, cause the one or more processors to perform operations comprising:

broadcasting, by one or more computing devices, a request that indicates a need for a number of carts at a location;

receiving confirmation from one or more carts that accept the request, the one or more carts are carts that are close to the location;

sending instructions to the one or more carts instructing the one or more carts to navigate to the location;

receiving, from a scanner of a baggage handling system, scanned data of baggage that is loaded into the one or more carts assigned to transport the baggage;

receiving, from each of the one or more carts, a message indicating the cart is full;

sending instructions to each cart to navigate to a destination of the baggage according to a list of bags inside each cart;

receiving three-dimension (3D) images of a bag;

generating, using the 3D images of the bag, a data array including volumetric calculations of the bag;

generating an image feature vector using a set of features extracted from the 3D images of the bag; and generating a unique identifier (ID) for the bag using the data array and the image feature vector, wherein generating the unique ID for the bag comprises:

hashing the data array and the image feature vector separately to obtain resulting hashes;

concatenating the resulting hashes to obtain a concatenated result; and hashing the concatenated result to create the unique ID for the bag.

12. The system of claim 11, wherein the operations comprise:

comparing the volumetric calculation of the bag with bag data stored in a database to identify a set of possible match bags;

identifying a match bag, from the set of possible match bags, using the image feature vector; and updating the database with tracking information of the bag, wherein the tracking information comprises the ID of the match bag, a timestamp, and a location of the scan point.

13. The system of claim 11, wherein generating the unique ID for the bag comprises:

pairing the image feature vector with each value individually in the data array to obtain a pairing array;

hashing each value in the pairing array to obtain a corresponding hash result; and generating, as the ID of the bag, an ID array including each hash result.

14. The system of claim 13, wherein the operations comprise:

calculating a scan ID array based on the volumetric calculation and the image feature vector, wherein the scan ID array includes a plurality of scan hashes for the bag;

determining a similarity coefficient for each scan hash included in the scan ID array by comparing the scan hash with a corresponding hash in the ID array of each bag stored in a database;

determining a valid match for a scan hash in response to determining that the similarity coefficient for the scan hash satisfies a hash similarity threshold;

identifying a match bag based on that a number of valid hash matches between the scan ID array and the ID array of the match bag satisfies a matching threshold; and updating the database with tracking information of the bag, wherein the tracking information comprises the ID of the match bag, a timestamp, and a location of the scan point.

\* \* \* \* \*